US012676946B2

(12) United States Patent
Chen et al.

(10) Patent No.: US 12,676,946 B2
(45) Date of Patent: Jul. 7, 2026

(54) PROJECTING APPARATUS, ILLUMINATION SYSTEM AND LIGHT UNIFORMIZATION SYSTEM THEREOF

(71) Applicant: Coretronic Corporation, Hsin-Chu (TW)

(72) Inventors: Yu-Peng Chen, Hsin-Chu (TW); Chun-Hsin Lu, Hsin-Chu (TW); Wen-Chieh Chung, Hsin-Chu (TW); Yan-Wen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/187,930

(22) Filed: Apr. 23, 2025

(65) Prior Publication Data

US 2026/0019539 A1 Jan. 15, 2026

Related U.S. Application Data

(60) Provisional application No. 63/638,952, filed on Apr. 26, 2024.

(30) Foreign Application Priority Data

| Jul. 9, 2024 | (CN) | 202410913138.4 |
| Dec. 2, 2024 | (CN) | 202411748453.2 |

(51) Int. Cl.
 H04N 9/31 (2006.01)
(52) U.S. Cl.
 CPC ......... H04N 9/3152 (2013.01); H04N 9/3111 (2013.01); H04N 9/3161 (2013.01); H04N 9/3164 (2013.01); H04N 9/317 (2013.01)

(58) Field of Classification Search
 CPC .. H04N 9/3111; H04N 9/3152; H04N 9/3161; H04N 9/3164; H04N 9/317
 See application file for complete search history.

(56) References Cited

U.S. PATENT DOCUMENTS

| 10,824,069 B2 * | 11/2020 | Tsai | G02B 27/1006 |
| 2003/0147255 A1 * | 8/2003 | Im | H04N 9/315 |
| | | | 362/558 |

(Continued)

FOREIGN PATENT DOCUMENTS

| CN | 203232911 U | 10/2013 |
| CN | 215813711 U | 2/2022 |

(Continued)

OTHER PUBLICATIONS

EP25172172 European search report dated Sep. 23, 2025.

*Primary Examiner* — Michael B. Pierorazio

(57) ABSTRACT

The present disclosure provides a projection apparatus an illumination system and a light uniformization system thereof. The light uniformization system includes a lens array element including a first array region and a second array region. The first array region has a first light incident surface, a first light exiting surface and a plurality of first micro lenses. The second array region has a second light incident surface, a second light exiting surface and a plurality of second micro lenses. The first light incident surface and the second light exiting surface are on the same surface of the lens array element.

43 Claims, 27 Drawing Sheets

(56)                    References Cited

U.S. PATENT DOCUMENTS

| | | | |
|---|---|---|---|
| 2007/0165185 A1* | 7/2007 | Chen | G03B 21/2013 |
| | | | 353/94 |
| 2007/0242231 A1* | 10/2007 | Chen | G03B 21/208 |
| | | | 353/34 |
| 2008/0165328 A1* | 7/2008 | Liao | G03B 21/208 |
| | | | 353/94 |
| 2009/0161076 A1* | 6/2009 | Chen | G03B 21/20 |
| | | | 353/31 |
| 2013/0321718 A1* | 12/2013 | Huang | G02B 30/25 |
| | | | 349/5 |
| 2022/0141432 A1 | 5/2022 | Maeda et al. | |
| 2023/0418140 A1* | 12/2023 | Kuo | H04N 9/3179 |
| 2024/0069425 A1* | 2/2024 | Lu | G03B 21/204 |
| 2024/0073378 A1* | 2/2024 | Lu | H04N 9/3167 |
| 2024/0402490 A1* | 12/2024 | Lin | G02B 27/0101 |
| 2025/0088612 A1* | 3/2025 | Wang | H04N 9/3152 |
| 2025/0274569 A1* | 8/2025 | Wang | H04N 9/3158 |

FOREIGN PATENT DOCUMENTS

| | | |
|---|---|---|
| CN | 218767782 U | 3/2023 |
| CN | 218938759 U | 4/2023 |
| CN | 219417853 U | 7/2023 |
| JP | 2023065241 A | 5/2023 |
| WO | 2019/071951 A1 | 4/2019 |

* cited by examiner

14'

1A

10B: B10, B11, 50

1A

PROJECTING APPARATUS, ILLUMINATION SYSTEM AND LIGHT UNIFORMIZATION SYSTEM THEREOF

CROSS-REFERENCE TO RELATED APPLICATIONS

This non-provisional application claims priority claim under 35 U.S.C. § 119 (a) on China Patent Application No. 2024109131384 filed on Jul. 9, 2024 and China Patent Application No. 202411748453.2 filed on Dec. 2, 2024, the entire contents of which are hereby incorporated by reference.

This application claims an invention which was disclosed in Provisional Application No. 63/638,952, filed Apr. 26, 2024, entitled "Light Uniformizing System and Projection apparatus Utilizing the Same". The benefit under 35 USC § 119 (e) of the United States provisional application is hereby claimed, and the aforementioned application is hereby incorporated herein by reference.

BACKGROUND OF THE INVENTION

Field of the Invention

The disclosure relates to a technical field of projection equipment, and more particularly to a light uniformization system configured to uniformize light beams, an illumination system and a projection apparatus equipped with the light uniformization system and a projection apparatus equipped with the illumination system.

Description of the Related Art

A beam emitted by a laser light source is a highly coherent laser beam. The energy of the laser beam would be concentrated in a small area, and therefore a speckle phenomenon is produced. When the laser light source is applied to a projection apparatus, since the projection apparatus functions finally to form an image through an image modulator which modulates the beam with a two-dimensional optical structure to form the image, the coherence of the laser beam must be destroyed through a variety of optical elements and be evenly diffused to form a two-dimensional beam when it is applied to the projection apparatus.

Conventional light uniformization system in the projection apparatus includes much more elements. Therefore, the size of the projection apparatus is bigger and the cost of the manufacturing the projection apparatus is increased. Conventional illumination system of projection equipment include dynamic elements such as a diffusion wheel and an actuator. The dynamic elements cause the illumination system to occupy a large space in the projection apparatus and become an obstacle to the miniaturization of the projection equipment.

The information disclosed in this Background section is only for enhancement of understanding of the background of the described technology, and therefore, it may contain information that does not form the prior art that is already known to a person of ordinary skill in the art. Furthermore, the information disclosed in the Background section does not mean that one or more problems to be resolved by one or more embodiments of the disclosure was acknowledged by a person of ordinary skill in the art.

BRIEF SUMMARY OF THE DISCLOSURE

The disclosure provides a light uniformization system and a projection apparatus utilizing the same to solve the problems of the oversized light engine and the complicated assembly process due to the increased number of elements caused by multiple lens array elements being separately mounted.

Other objects and advantages of the present disclosure are to be understood from technical features disclosed in the present disclosure. To realize one or more or all of the aforementioned objects or other related objects, the present disclosure provides an embodiment of a light uniformization system for uniformizing a plurality of first laser light beams from a light source module. The first laser light beams enter the light uniformization system along a first direction and exit the light uniformization system along a direction parallel to the first direction to form an illumination light. The light uniformization system includes a lens array element having a first array region and a second array region connected to each other and arranged along a second direction. The first array region includes a first light incident surface, a first light exiting surface and a plurality of first micro lenses, and the first laser light beams enter the first array region through the first light incident surface along the first direction, pass through the first micro lenses and exit the first array region through the first light exiting surface to form a first light beam. The second array region includes a second light incident surface, a second light exiting surface and a plurality of second micro lenses, and the first light beam enters the second array region through the second light incident surface, passes through the second micro lenses and exits the second array region through the second light exiting surface to form a second light beam. The first light incident surface and the second light exiting surface are located at a same surface of the lens array element, and the first direction is perpendicular to the second direction.

The present disclosure provides an embodiment of a projection apparatus. The projection apparatus includes an illumination system, a light modulation module, and a projecting lens. The illumination system has a light source module and the light uniformization system as mentioned above, and a light source module is configured to emit first laser light beams. The light uniformization system is disposed in an optical path of the first laser light beams, wherein the first laser light beams are incident to the lens array element through the first light incident surface of the first array region and uniformized several times in the light uniformization system, and an illumination light is emitted from the light uniformization system. The light modulation module is disposed in an optical path of the illumination light and is configured to receive the illumination light and convert the illumination light to image light. The projecting lens is disposed in an optical path of the image light and configured to project the image light.

As aforementioned, the light uniformization system and the projection apparatus utilizing the same have at least one of the following advantageous effects. The integrally-structured lens array element can be manufactured with a single mold, and alignment and calibration are inherently accomplished, for the manufacturing g process meets the design requirements. As no assembly process is needed for the integrally-structured lens array element, the manufacturing cost is lowered and the manufacturing process is simplified. The integrally-structured lens array element has fewer elements, thereby reducing the size of the light engine. Moreover, the present disclosure utilizes the static lens array element to eliminate speckles of light spots of the light beams, and the number of movable diffusing elements is also reduced, thereby promoting reliability and the user experience. The disclosure provides an embodiment of illumination system. The illumination system for providing an illumination light, includes a light uniformization system as mentioned above, a light source module, an LED light source module, and an optical path integration element. The light source module configured to emit the first laser light beams. The LED light source module is configured to emit an output light beam. The optical path integration element is disposed in an optical path of the output light beam and an optical path of the first light beam, wherein the first light beams and the output light beam are respectively incident on two opposite sides of the optical path integration element. The first light beam is guided and transmitted to the second array region of the lens array element by the optical path integration element, the first light beam pass through the second array region of the lens array element to form the second light beam. The output light beam is guided by the optical path integration element to form an output color light beam, the output color light beam penetrates the second array region of the lens array element, and the illumination light comprises the output color light beam or/and the second light beam.

The disclosure provides an embodiment of a projection apparatus including the aforementioned illumination system, projection apparatus includes the illumination system as mentioned above, a light modulation module, and a projection lens. The output color light or/and the second laser light beam are generated by the illumination system to form the illumination light. The light modulation module is disposed in an optical path of the illumination light and configured to receive the illumination light and convert the illumination light to an image light. The projection lens is disposed in an optical path of the image light and configured to project the image light to form an image.

Other objectives, features and advantages of the present disclosure will be further understood from the further technological features disclosed by the embodiments of the present disclosure, wherein there are shown and described preferred embodiments of this disclosure, simply by way of illustration of modes best suited to carry out the disclosure.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE
DISCLOSURE

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The elements of the present disclosure can be positioned in a number of different orientations. As such, the directional terminology is used for purposes of illustration and is in no way limiting. On the other hand, the drawings are only schematic and the sizes of elements may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" element facing "B" element herein may contain the situations that "A" element directly faces "B" element or one or more additional elements are between "A" element and "B" element. Also, the description of "A" element "adjacent to" "B" element herein may contain the situations that "A" element is directly "adjacent to" "B" element or one or more additional elements are between "A" element and "B" element. Accordingly, the drawings and descriptions will be regarded as illustrative in nature and not as restrictive.

Figure 1:
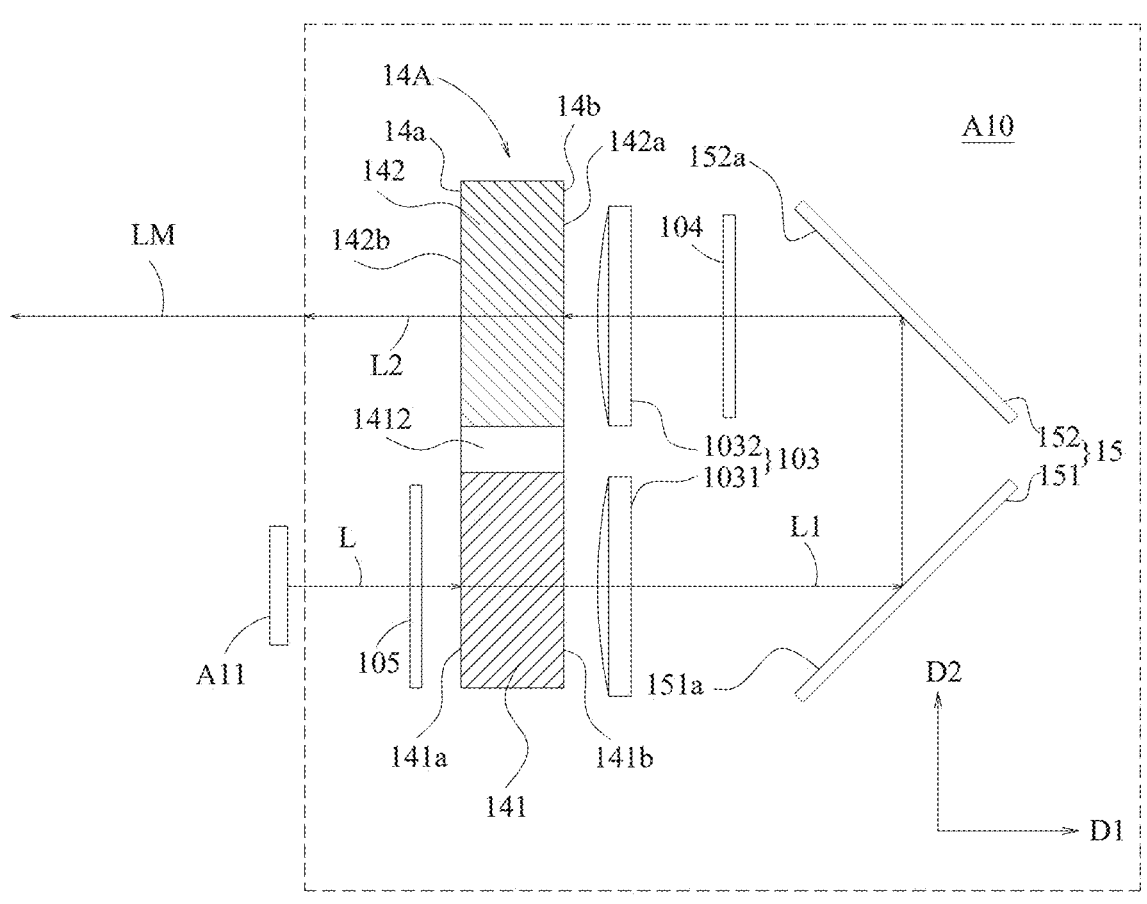
FIG. 1 is a schematic view of an embodiment of a light uniformization system of the present disclosure.
Figure 2:
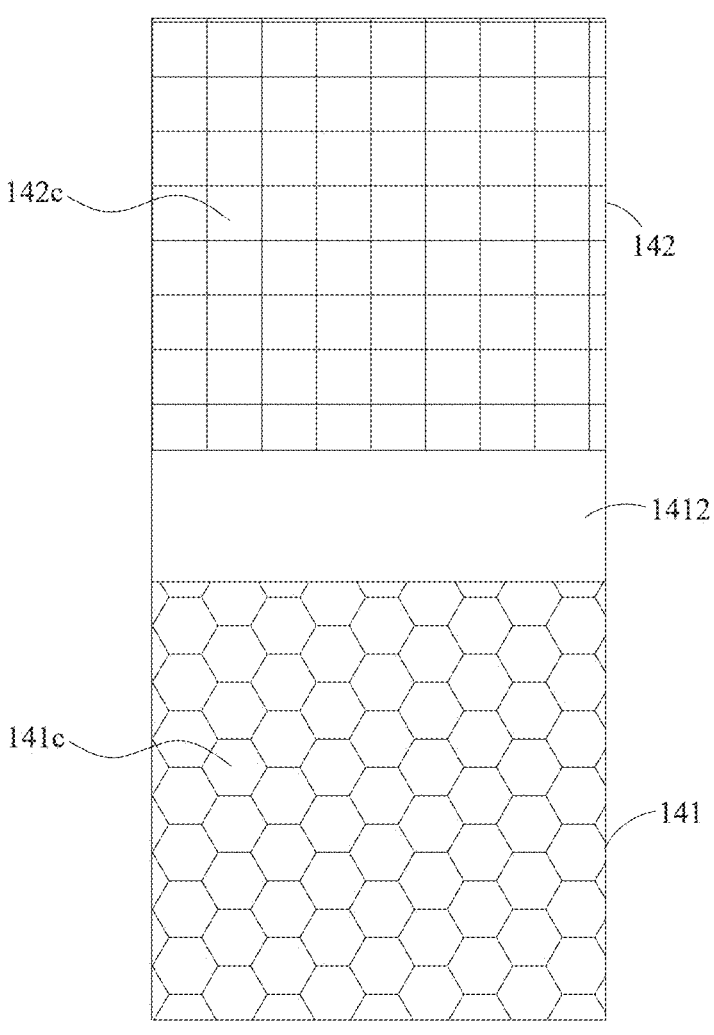
FIG. 2 is a schematic view of a lens array element of the light uniformization system of FIG. 1.

Referring to FIGS. 1 and 2, a light uniformization system A10 shown in FIG. 1 includes a lens array element 14A including a first array region 141, a second array region 142 and a connecting region 1412. Laser light beams L generated by a light source module A11 enter the light uniformization system A10 along a first direction D1 and exit the light uniformization system A10 along a direction parallel to the first direction D1 to become an illumination light LM. The first array region 141, the second array region 142 and the connecting region 1412 of the lens array element 14 are arranged along a second direction D2 perpendicular to the first direction D1.

The lens array element 14A of the embodiment is integrally structured. That is, the first array region 141, the second array region 142 and the connecting region 1412 are connected to each other. Furthermore, the first array region 141, the second array region 142 and the connecting region 1412 are made by integrated molding process. The opposite ends of the connecting region 1412 are connected to the first array region 141 and the second array region 142 respectively, whereby the connecting region 1412 is located between the first array region 141 and the second array region 142 in the second direction D2. The lens array element 14 is rectangular, wherein the first array region 141 and the second array region 142 are disposed at opposite ends thereof, and the connecting region 1412 is disposed in the middle.

The first lens array region 141 has a first light incident surface 141a, a first light exiting surface 141b opposite to the first light incident surface 141a and a plurality of first micro lenses 141c disposed on the first light incident surface 141a and/or the first light exiting surface 141b respectively. Each of the first micro lenses 141c is hexagonal or square in shape, but they are not limited thereto. The second array region 142 has a second light incident surface 142a, a second light exiting surface 142b and a plurality of second micro lenses 142c disposed on the second light incident surface 142a and/or the second light exiting surface 142b respectively. Each of the second micro lenses 142c is hexagonal or square in shape, but they are not limited thereto.

The first light incident surface 141a and the second light exiting surface 142b are on the same surface, a first surface 14a, of the lens array element 14A. The first light exiting surface 141b and the second light incident surface 142a are on the same surface, a second surface 14b, of the lane array element 14A. The first surface 14a and the second surface 14b are oppositely disposed and orthogonal to the first direction D1.

When the light source module A11 generates the laser light beams L, the laser light beams L enter the first array region 141 through the first light incident surface 141a and pass through at least a portion of the first micro lenses 141c, and afterwards the laser light beams L exit the first array region 141 through the first light exiting surface 141b to form first light beam L1. The first micro lenses 141c uniformize the laser light beams L to eliminate speckles of the laser light beams from the light source module A11. The first light beam L1 are primarily uniformization light beams. Afterwards, the first light beam L1 enter the second array region 142, pass through at least a portion of the second micro lenses 112c, and exit the second array region 142 through the second light exiting surface 142b along a direction opposite to the first direction D1 to form second light beams L2.

In at least one embodiment, the second light beams L2 exit the second array region 142 from the second light exiting surface 142b and leave the light uniformization system A10 to become the illumination light LM. In other words, the second array region 142 here is utilized to adjust the angle distribution of the first light beam L1 to obtain the second light beams L2 (or the illumination light LM) meeting design requirements. In this way, the exiting direction of the first light beam L1 from the first array region 141 and the exiting direction of the second light beams L2 from the second array region 142 are opposite and parallel to each other, both being parallel to the first direction D1.

As the lens array element 14A is integrally structured, the first array region 141 and the second array region 142 are formed by the same material. Moreover, the first array region 141 and the second array region 142 are the same in thickness. Since the laser light beams L enter the first array region 141 along a direction perpendicular to the first light incident surface 141a and the first light beam L1 enter the second array region 142 along a direction perpendicular to the second light incident surface 142a, the laser light beams L propagate in the first array region 141 for a distance equal to that of the first light beam L1 propagating in the second array region 142. The laser light beams L from the light source module A11 pass through the light uniformization system A10 to be uniformized by the first array region 141 and the second array region 142, and finally the illumination light LM having a two-dimensional light field are formed.

In at least one embodiment, the light uniformization system A10 further includes a first optical path folding unit 15 configured to change a transmission direction of the first light beam L1. The first optical path folding unit 15 is disposed in an optical path between the first light exiting surface 141b and the second light incident surface 142a. The first light beam L1 emitted from the first light exiting surface 141b enter the first optical path folding unit 15 along a first transmission direction and leave the first optical path folding unit 15 along a second transmission direction, wherein the first transmission direction and the second transmission direction are opposite and parallel to each other, both being parallel to the first direction D1, whereby the optical path of the first light beam L1 between the first light exiting surface 141b and the second light incident surface 142a forms a U shape.

In at least one embodiment, the light uniformization system A10 further includes a first light condensing unit 103 disposed in the optical path of the first light beam L1 between the first light exiting surface 141b and the second light incident surface 142a to converge the first light beam L1. Specifically, the first light condensing unit 103 includes a first condensing lens 1031 and a second condensing lens 1032. The first optical path folding unit 15 includes a first reflecting element 151 and a second reflecting element 152. The first condensing lens 1031 is disposed between the first array region 141 and the first reflecting element 151. The second condensing lens 1032 is disposed between the second reflecting element 152 and the second array region 142. In at least one embodiment, the first reflecting element 151 has a reflecting surface 151a, and the second reflecting element 152 has a reflecting surface 152a facing and orthogonal to the reflecting surface 151a. The reflecting surface 152a of the second reflecting element 152 is arranged such that it is disposed at an angle of 45° with respect to the first light exiting surface 141b and also at an angle of 45° with respect to the second light incident surface 142a, but it is not limited thereto. The first light beam L1 emitting from the first light exiting surface 141b converge through the first light condensing lens 1031 and propagate to the first reflecting element 151 of the first optical path folding unit 15 along a first transmission direction. The reflecting surface 152a of the first reflecting element 151 reflects the first light beam L1, whereby the first light beam L1 propagates along a second transmission direction to leave the second reflecting element 152 and pass through the second condensing lens 1032 and the second array region 142 sequentially.

In at least one embodiment, the light uniformization system A10 further includes a first light diffusing element 104 disposed between the second reflecting element 152 and the second array region 142, and the first light beam L1 passes through the first light diffusing element 104 to be diffused thereby before the first light beam L1 is incident to the second light incident surface 142a.

In at least one embodiment, the light uniformization system A10 further includes a second light diffusing element 105 disposed in front of the first light incident surface 141a of the first array region 141 along the first direction D1, and the laser light beams L pass through the second light diffusing element 105 for initial diffusion before the laser light beams L are incident to the first light incident surface 141a.

Figure 3:
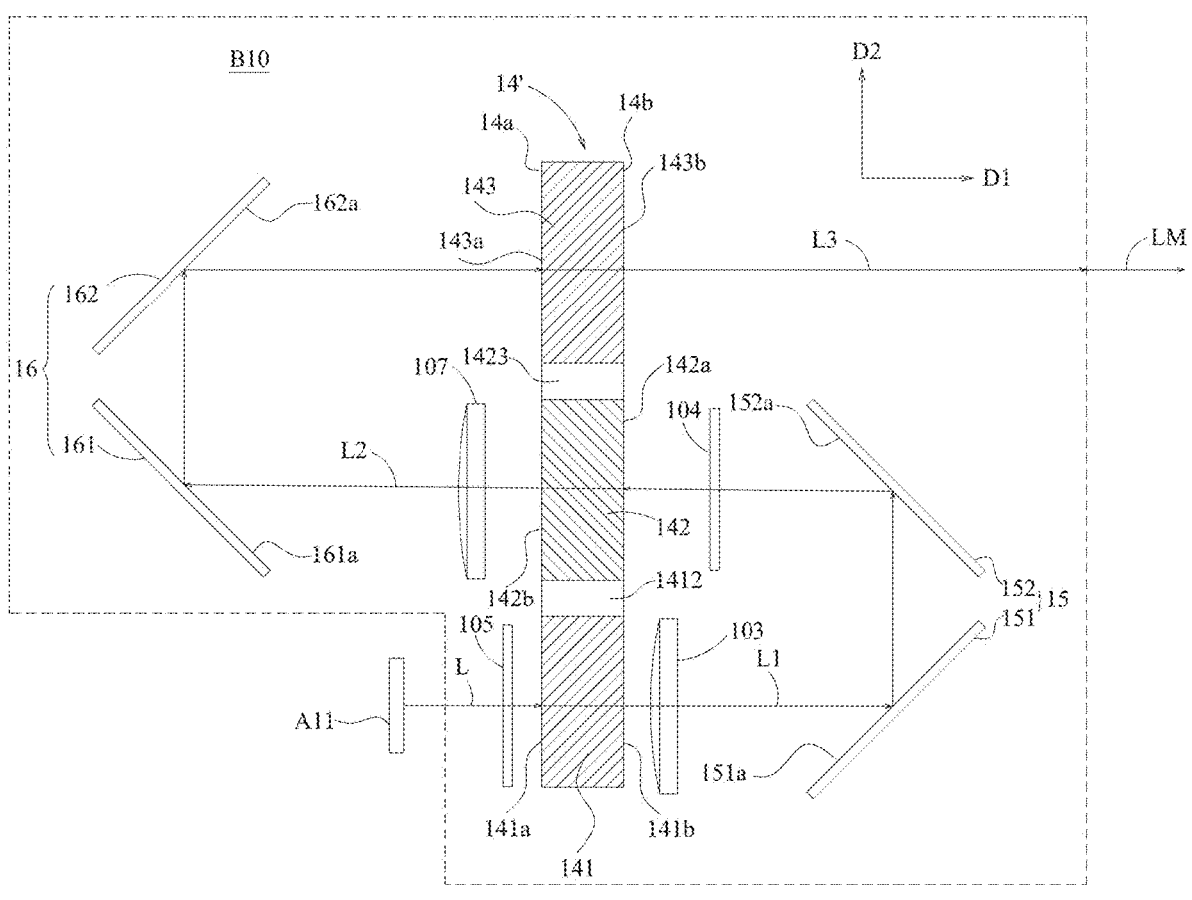
FIG. 3 is a schematic view of another embodiment of a light uniformization system of the present disclosure.
Figure 4:
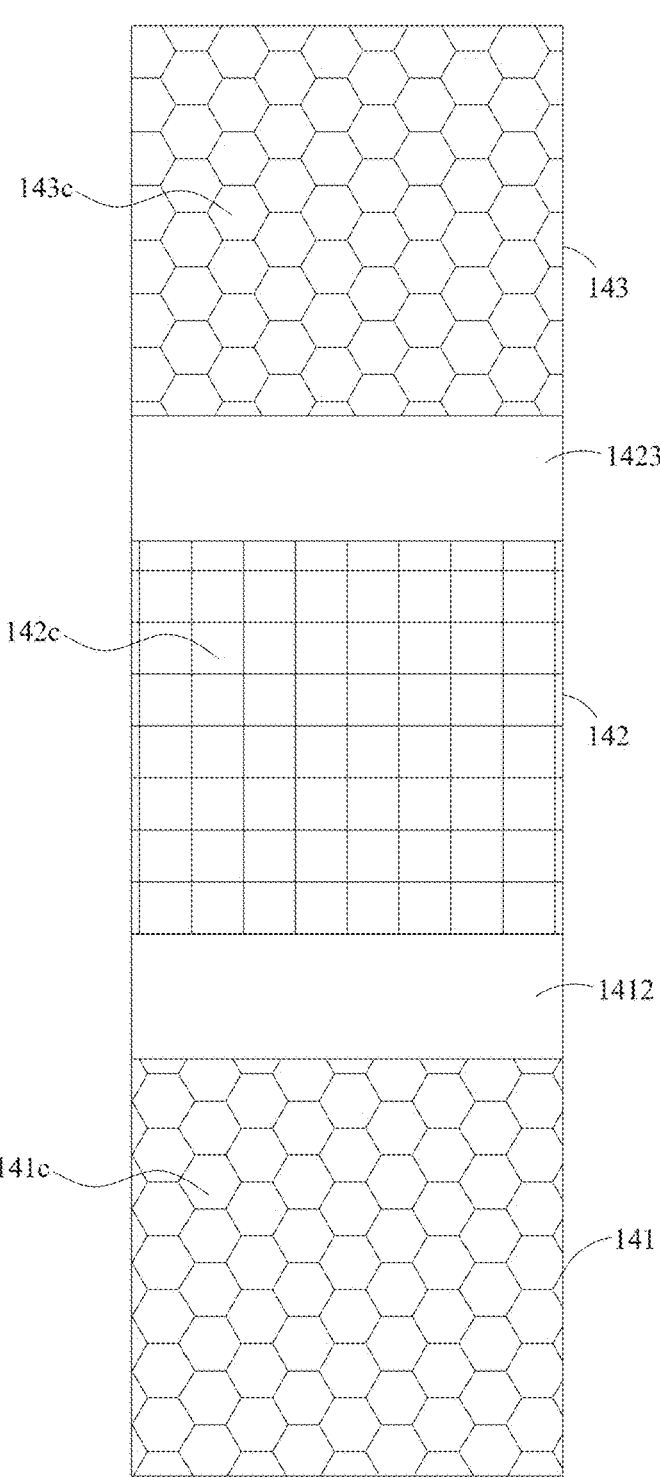
FIG. 4 is a schematic view of a lens array element of the light uniformization system of FIG. 3.

Referring to FIGS. 3 and 4, another embodiment of the light uniformization system is disclosed. The embodiment has a portion of the structures being the same to the structures of the previous embodiment, and the same elements are given the same numerical identifiers, and the descriptions thereof are thus omitted. The lens array element 14' of the uniformization system B10 of the embodiment further includes a third array region 143, wherein the first array region 141, the second array region 142 and the third array region 143 are connected to each other and arranged along the second direction D2. The second array region 142 is located between the first array region 141 and the third array region 143. The lens array element 14' of the embodiment has two connecting regions 143. One of the two connecting regions 1412 connects the first array region 141 and the second array region 142, and the other one of the two connecting regions 1423 connects the second array region 142 and the third array region 143.

The third array region 143 has a third light incident surface 143a, a third light exiting surface 143b and a plurality of third micro lenses 143c disposed on the third light incident surface 143a and/or the third light exiting surface 143b respectively. Each of the third micro lenses 143c is hexagonal or square in shape, but they are not limited thereto. The first light incident surface 141a, the second light exiting surface 142b and the third light incident surface 143a are located on the same surface, that is, the first surface 14a of the lens array element 14', and the first light exiting surface 141b, the second light incident surface 142a and the third light exiting surface 143b, and the third light exiting surface 143b are on the same surface, that is, the second surface 14b of the lens array element 14'.

The second light beams L2 exiting from the second light exiting surface 142b enter the third array region 143 through the third light incident surface 143a. After the second light beams L2 pass through at least a portion of the third micro lenses 143c, the second light beams L2 exit from the lens array element 14' through the third light exiting surface 143b to form third light beams L3. The third light beams L3 of the embodiment leave the light uniformization system B10 to form the illumination light LM. A light exiting direction of the third light beam L3 from the third array region 143 is parallel to and the same as that of the first light beam L1 from the first array region 141, both being parallel to the first direction D1.

In at least one embodiment, the light uniformization system B10 further includes a second optical path folding unit 16 disposed in an optical path of the second light beams L2 between the second light exiting surface 142b and the third light incident surface 143a to change the transmission direction of the second light beams L2. The second light beams L2 exiting from the second light exiting surface 142b enter the second optical path folding unit 16 along a second transmission direction and leave the second optical path folding unit 16 along a third transmission direction. The second transmission direction and the third transmission direction are the same and both parallel to the first direction D1, whereby the optical path of the second light beams L2 between the second light exiting surface 142b and the third light incident surface 143a is U-shaped. Therefore, the whole optical path of the light beams in the light uniformization system B10 of the embodiment is S-shaped.

Specifically, the second optical path folding unit 16 includes a third reflecting element 161 having a reflecting surface 161a and a fourth reflecting element 162 having a reflecting surface 161b. The reflecting surface 161a and the reflecting surface 162a are opposite and orthogonal. The reflecting surface 161a is disposed at an angle of 45° with respect to the second light exiting surface 142b and also at an angle of 45° with respect to the third light exiting surface 143a, but it is not limited thereto. The second light beams L2 leave the second array region 142 through the second light exiting surface 142b and propagate to the third reflecting element 161 along the second transmission direction. The reflecting surface 161a reflects the second light beams L2 to propagate to the fourth reflecting element 162 along the second direction D2. The reflecting surface 162a of the fourth reflecting element 162 reflects the second light beams L2 to enter the third array region 143 along a third transmission direction.

The first light condensing unit 103 of the embodiment is a single condensing lens 103 disposed in an optical path of the first light beam L1 between the first light exiting surface 141*b* and the first reflecting element 151. In other embodiments, the condensing lens 103 (the first light condensing unit) is disposed in an optical path of the first light beam L1 between the second reflecting element 152 and the second light incident surface 142*a*. Otherwise, as in the previous embodiment and as shown in FIG. 1, the first light condensing unit 103 including the first condensing lens 1031 and the second condensing lens 1032 is utilized. However, it is not limited thereto.

In at least one embodiment, the light uniformization system B10 further includes a second light condensing element 107 disposed in an optical path of the second light beams L2 between the second light exiting surface 142*b* and the third light incident surface 143*a* to converge the second light beams L2.

As aforementioned, the lens array element of the light uniformization system of the disclosure is not limited to two array regions or three array regions. In other embodiments, the lens array element may include four or more than four array regions.

The integrally-structured lens array element can be manufactured with a single mold, and alignment and calibration are inherently accomplished by the manufacturing process meeting the design requirements. As no assembly process is needed for the integrally-structured lens array element, the manufacturing cost is lowered and the manufacturing process is simplified. The integrally-structured lens array element has fewer elements, thereby reducing the size of the optical engine.

Figure 5:
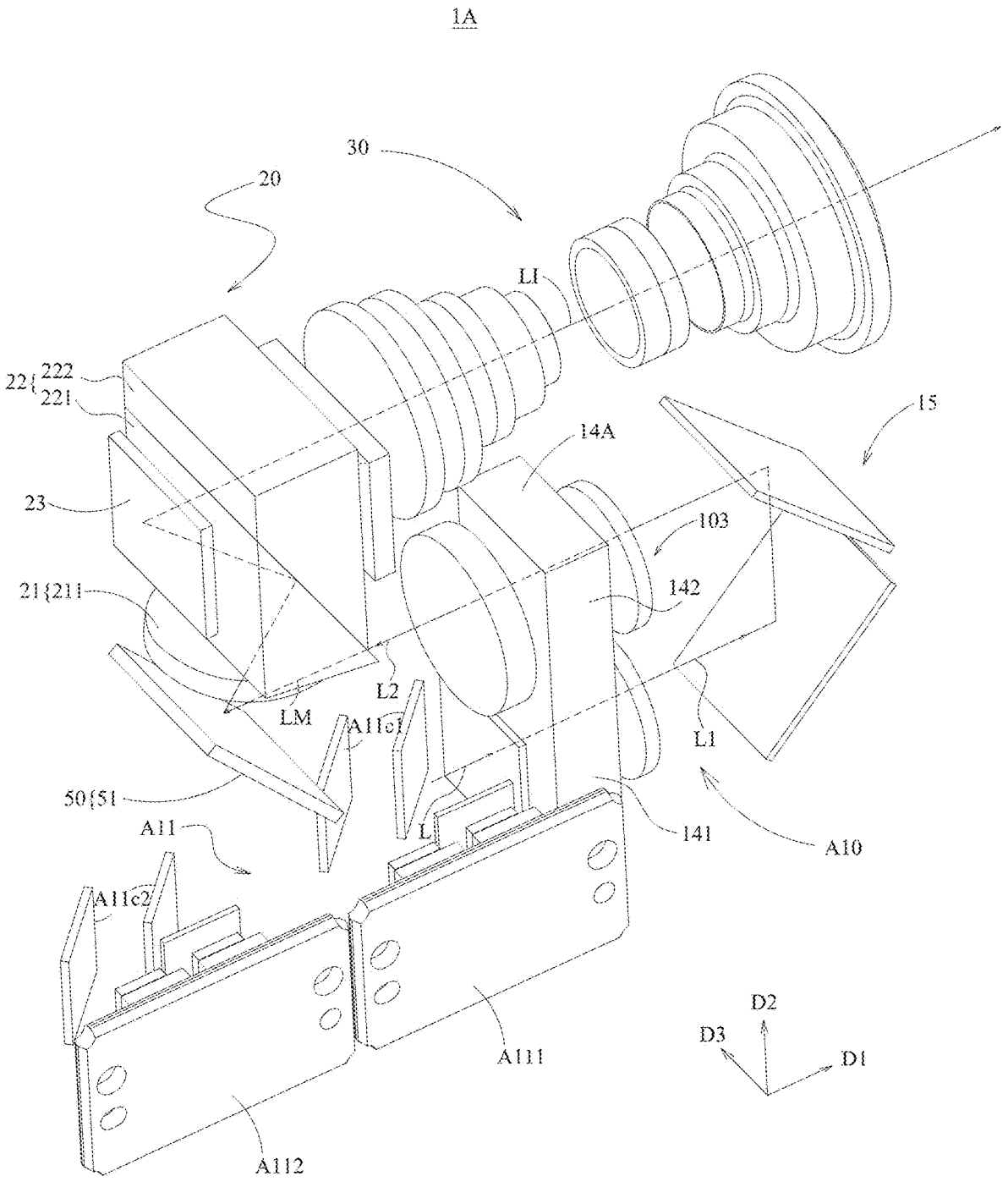
FIG. 5 is a perspective view of a first embodiment of a projection apparatus of the present disclosure.
Figure 6:
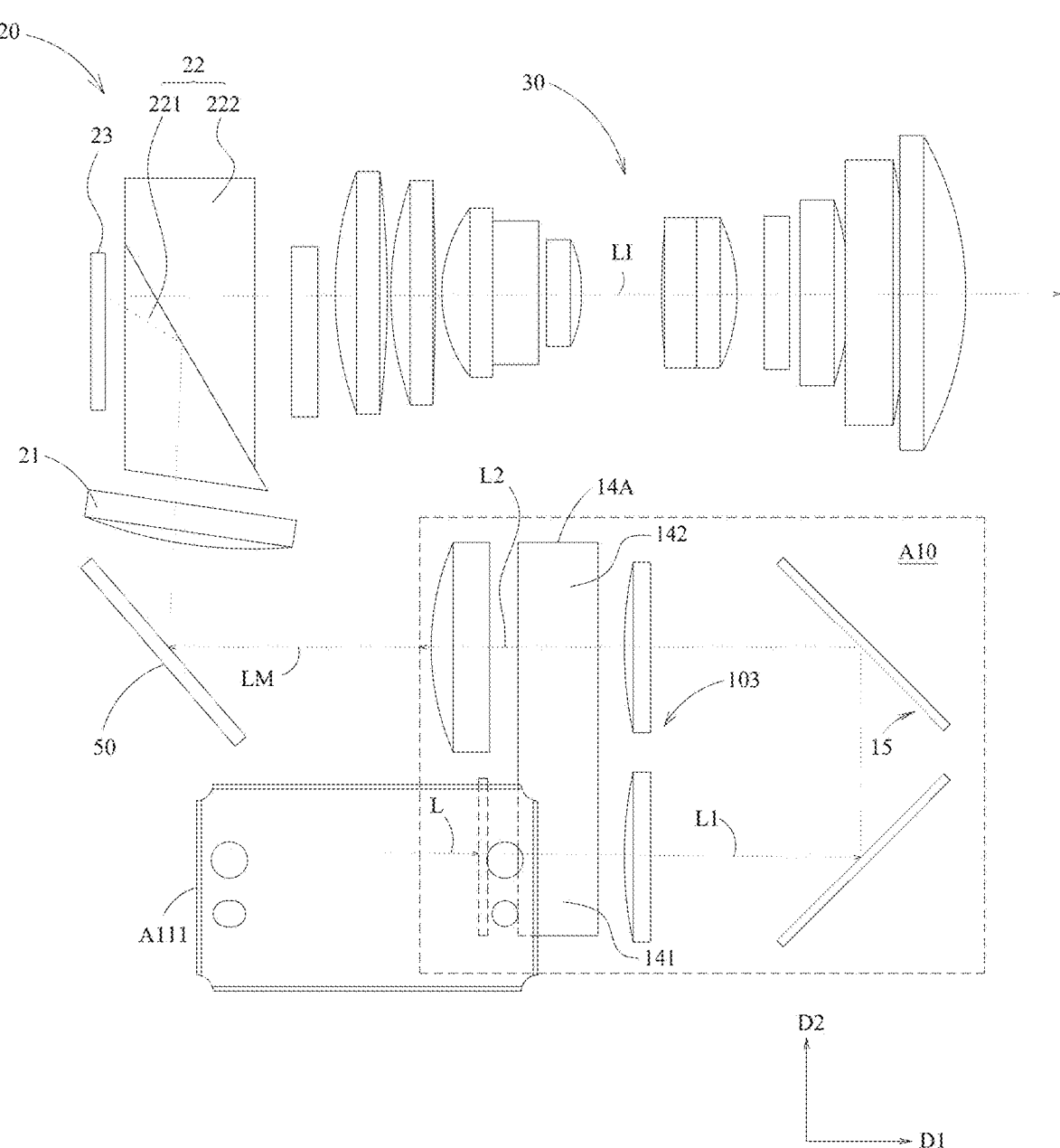
FIG. 6 is a side view of the projection apparatus of FIG. 5, wherein a light emitting element 22 is omitted.
Figure 7:
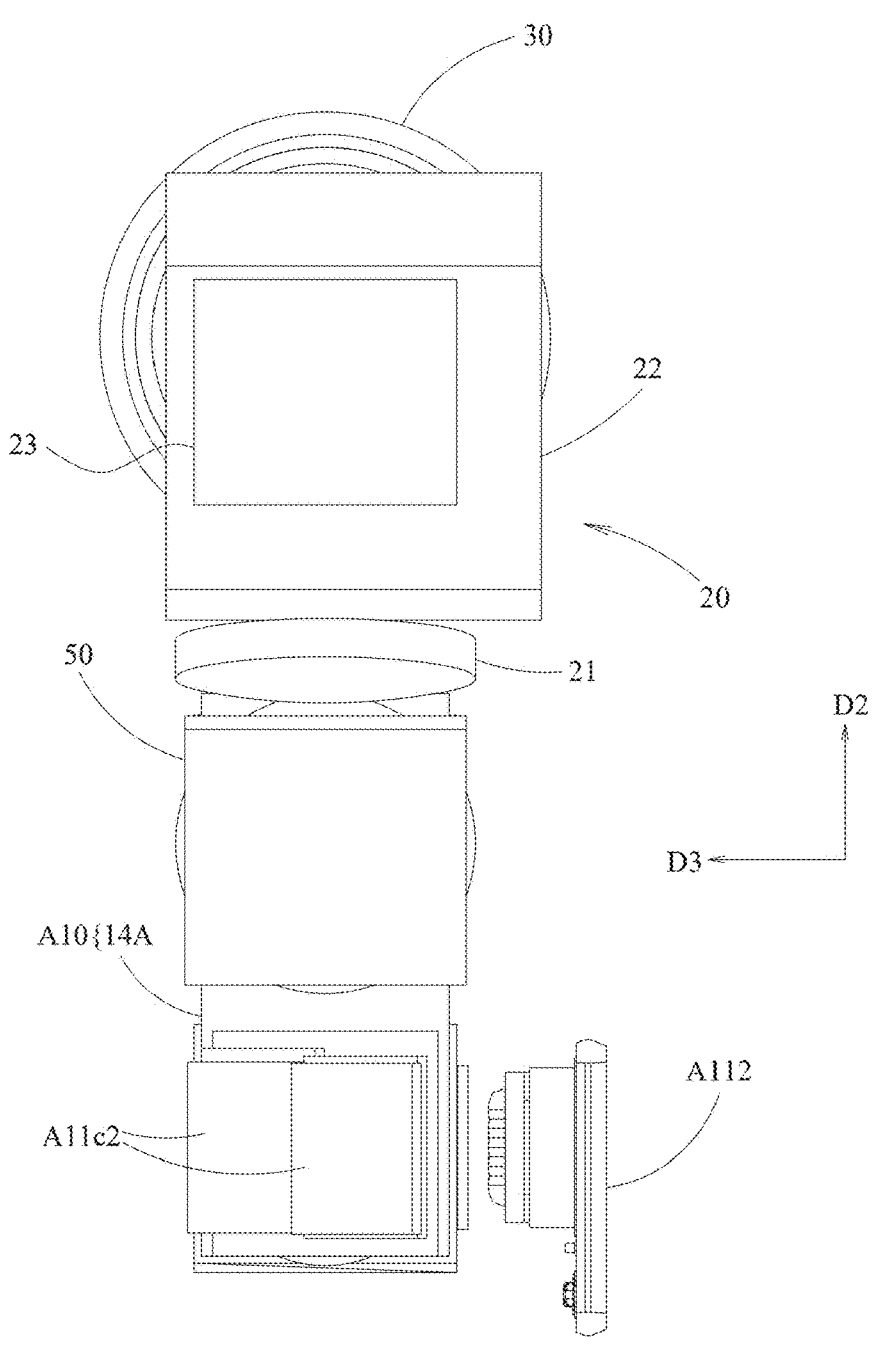
FIG. 7 is a rear view of the projection apparatus of FIG. 5, wherein a light emitting element 21 is omitted.

Referring to FIGS. 5, 6 and 7, an embodiment of a projection apparatus is disclosed. The projection apparatus 1A of the embodiment includes the light illumination system A10, a light modulation module 20 and a projecting lens 30. The light illumination system A10 includes the light uniformization system A10 and a light source module A11 for providing an illumination light LM to the light modulation module 20.

The light source module A11 emits the laser light beams L. The light uniformization system A10 is disposed in the optical path of the laser light beams L. The laser light beams L are incident to the light array element 14A through the first light incident surface 141*a* of the first array region 141 and uniformized several times in the light uniformization system A10 to obtain the illumination light LM. The light modulation module 20 disposed in the optical path of the illumination light LM receives the illumination light LM and converts the illumination light LM into image light LI. The projecting lens 30 disposed in an optical path of the image light LI projects the image light LI onto a screen.

The light source module A11 includes at least one laser light emitting unit (FIG. 5 shows two laser light emitting unit A111, A112), and each of the at least one laser light emitting unit may be a package. The laser light emitting unit has at least one light emitting element, and the light emitting element is a laser diode or combination of laser diode and the laser diode, and the number of laser diodes is single or multiple. When the number of the laser diodes is multiple, the plurality of the laser diodes can be arranged as an array. In one embodiment, each laser light emitting unit includes at least one laser diode emitting monochromatic light, such as a laser light source array composed of one or multiple laser diodes emitting blue light, a laser light source array composed of one or multiple laser diodes emitting red light, or a laser light source array composed of one or multiple laser diodes emitting green light. In one embodiment, each laser light emitting unit includes a plurality of light emitting elements emitting lights of different colors, such as a plurality of blue light laser diodes, a plurality of red-light laser diodes and a plurality of green light laser diodes. The laser light emitting unit may utilize a Quslas light source or an Octolas light source, but it is not limited thereto. In other embodiments, the light beams emitted from the at least one laser light emitting unit of the light source modules are combined by a light combination element, and afterwards the combined light beams enter the light uniformization system A10. The light source module A11 of the embodiment includes a plurality of laser light emitting units A111 and A112 emitting light beams of different colors and a plurality of light combination elements A11*c*1 and A11*c*2 combining the light beams emitted by the laser light emitting units A111 and A112 to form the laser light beams L and conducting the laser light beams L to enter the light uniformization system A10 along the first direction D1. In the present embodiment, the light beams emitted by the laser light emitting units A111 and A112 are transmitted along a third direction D3 to enter the light combination elements A11*c*1 and A11*c*2. The light combination elements A11*c*1 and A11*c*2 combine the light beams to form the laser light beams L and conduct the laser light beams L to enter the light uniformization system A10 along the first direction D1 perpendicular to the third direction D3. Therefore, the laser light beams of different colors from the light source module A11 enter the light uniformization system A10 along the first direction D1 in different time sequences or in the same time sequence. Moreover, the light uniformization system A10 for eliminating the speckles of the laser light beams L can be any one of the aforementioned light uniformization systems A10, but it is not limited thereto.

The light modulation module 20 includes an optical element 21, a prism element 22 and at least one light modulation element 23. The illumination light LM is sequentially transmitted to the optical element 21, the prism element 22 and at least one light modulation element 23. The light modulation element 23 converts the illumination light LM to image light LI, and the image beam LI from the light modulation element 23 propagates to the projecting lens 30. The light modulation element 33 can be digital micromirror device (DMD), liquid crystal on silicon (LCoS) or liquid crystal display (LCD), but it is not limited thereto. Moreover, in another embodiment, the light modulation module 20 may have a plurality of the light modulation elements 23. The number of the light modulation elements 23 is also not limited. For example, the projection apparatus can utilize one digital micromirror device or three digital micromirror devices.

In at least one embodiment, the optical element 21 includes a third condensing lens. The illumination light LM passing through the third condensing lens 21 is configured to converge to the prism element 22. The prism element 22 includes a first prism 221 and a second prism 222. The illumination light LM is totally reflected on an interface between the first prism 221 and the second prism 222 and afterwards is incident to the light modulation module 23 for converting the illumination light LM into image light LI. The image light LI passes through the first prism 221 and the second prism 222 and enter the projecting lens 30 along the first direction D1. The projecting lens 30 projects the image light LI onto a screen.

The projecting lens 30 includes one or multiple optical lenses provided with identical or different diopters. For example, the optical lens can be a non-planar lens, such as a biconvex lens, biconcave lens, concave-convex lens, convex-concave lens, plane convex lens or plane-concave lens, or any combination of such lenses. On the other hand, the projecting lens 30 can also include a planar optical lens. The structure of the projecting lens 30 is not limited in the present disclosure.

In at least one embodiment, the projection apparatus further includes a third optical path folding unit 50. The third optical path folding unit 50 includes a fifth reflecting element 51 disposed in an optical path of the illumination light LM to reflect the illumination light LM to the optical element 21 of the light modulation module 20.

In the embodiment, a first plane is defined by the first direction D1 and the second direction D2. FIG. 6 illustrates the projection apparatus of FIG. 5 viewed in a direction perpendicular to the first plane, but the light emitting elements A112 is not shown, and FIG. 7 illustrates the projection apparatus of FIG. 5 viewed in a direction parallel to the first plane, but the light emitting elements A111 is not shown. The light uniformization system A10, the light combination elements of the light source module A11, the light modulation element 20, the projecting lens 30 and the third optical path folding unit 50 are all disposed on the first plane, and orthographic projections of the uniformization system A10, the light modulation element 20, the projecting lens 30 and the third optical path folding unit 50 on the first plane do not overlap. A third direction D3 is defined to be perpendicular to the first plane. An orthographic projection of the second light exiting surface 142b of the second array region 142 of the lens array element 14A on a second plane defined by the second direction D2 and the third direction D3 is located between orthographic projections of the first light incident surface 141a of the first array region 141 and the light exiting plane of the projecting lens 30 on the second plane. In the present embodiment, the optical path of the laser light beams L incident to the uniformization system A10 along the first direction D1, the optical paths of the first light beam L1, the second light beams L2 and the illumination light LM emitted from the uniformization system A10 are on the first plane, and the optical paths of the illumination light LM emitted from the uniformization system A10 and the image light LI are also on the first plane.

In at least one embodiment, the second direction D2 is parallel to the direction of gravity, and the first plane is a vertical plane orthogonal to the horizontal plane. Therefore, a light incident position of the laser light beams L in the light uniformization system A10 (or the orthographic projection of the laser light beams L on the first light incident surface 141a), a light exiting position of the illumination light LM in the light uniformization system A10 (or the orthographic projection of the illumination light LM on the second light exiting surface 142b) and a light exiting position of the image light LI in the projecting lens 30 are arranged along a vertical direction. For example, the light incident position of the laser light beams L in the light uniformization system A10 is located at the bottommost position related to the light exiting position of the illumination light LM in the light uniformization system A10 and the light exiting position of the image light LI in the projecting lens 30. The light exiting position of the illumination light LM in the light uniformization system A10 is above the light incident position of the laser light beams L in the light uniformization system A10. The light exiting position of the image light LI in the projecting lens 30 is located at the topmost position related to the light exiting position of the illumination light LM in the light uniformization system A10 and the light incident position of the laser light beams L in the light uniformization system A10. In such a structure, the projection apparatus has a reduced size and thus a compact erect appearance.

In other embodiments, the third direction D3 is defined to be parallel to the direction of gravity, and the first direction D1 and the second direction D2 are perpendicular to the direction of gravity. The first plane is a horizonal plane. Therefore, the light incident position of the laser light beams L in the light uniformization system A10, the light exiting position of the illumination light LM in the light uniformization system A10 and the light exiting position of the image light LI in the projecting lens 30 are arranged along the horizontal direction. For example, the light incident position of the laser light beams L in the light uniformization system A10 is at the rightmost position related to the light exiting position of the illumination light LM in the light uniformization system A10 and the light exiting position of the image light LI in the projecting lens 30, the light exiting position of the illumination light LM in the light uniformization system A10 is in the center, and the light exiting position of the image light LI in the projecting lens 30 is at the leftmost position related to the light exiting position of the illumination light LM in the light uniformization system A10 and the light incident position of the laser light beams L in the light uniformization system A10. In such a structure, the projection apparatus has a reduced size and thus the appearance of lying flat.

Referring to FIGS. 8, 9, 10 and 11, another embodiment of a projection apparatus is disclosed. The present embodiment has a portion of the structures identical to the structures of the previous embodiment, and the identical elements are given the same numerical identifiers, so descriptions thereof are thus omitted.

In the embodiment, a projection apparatus 1A includes an illumination system 10B. The illumination system 10B includes a light source module B11 and a light uniformization system B10. The light source module B11 includes at least one laser light emitting unit and at least one light combination element. The light source module B11 includes the laser light emitting unit B111 is disposed at a line extending along the first direction D1 with respect to the light uniformization system B10, and the laser light emitting unit B112 is disposed at a line extending along the third direction D3 with respect to the light uniformization system B10. The laser light emitting unit B111 emits light beams of different colors into the light combination element B11c along the first direction D1 for combination therein, and the combined light beams enter the light uniformization system B10. The laser light emitting unit B112 emits light beams of different colors into the light combination element B11c2 along the third direction D3 for combination therein, and the transmission direction of the combined light beams is changed to the first direction D1 by the light combination element B11c2 to enter the light uniformization system B10.

Figure 10:
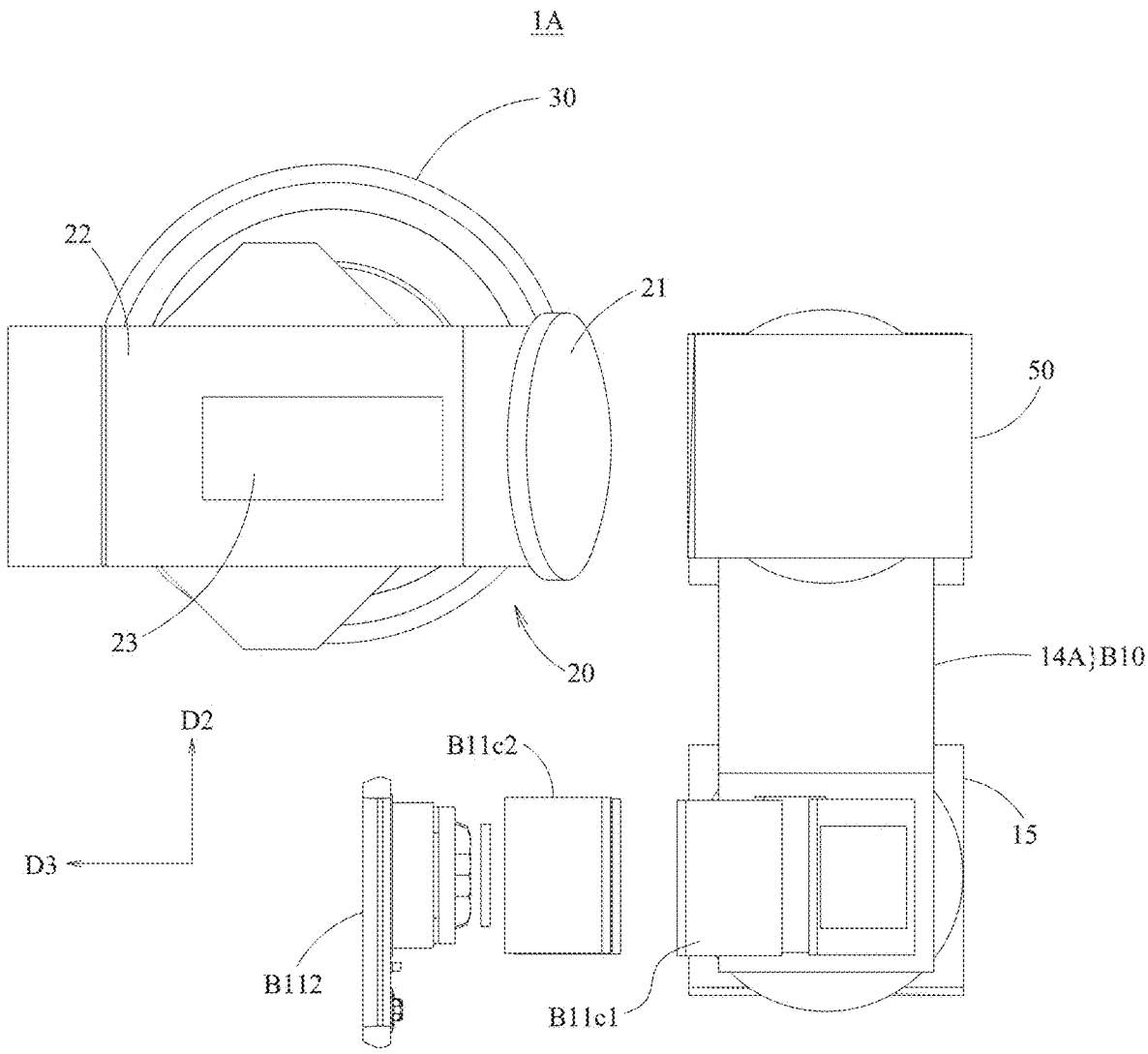
FIG. 10 is a rear view of the projection apparatus of FIG. 8, wherein the light emitting element 21 is omitted.
Figure 11:
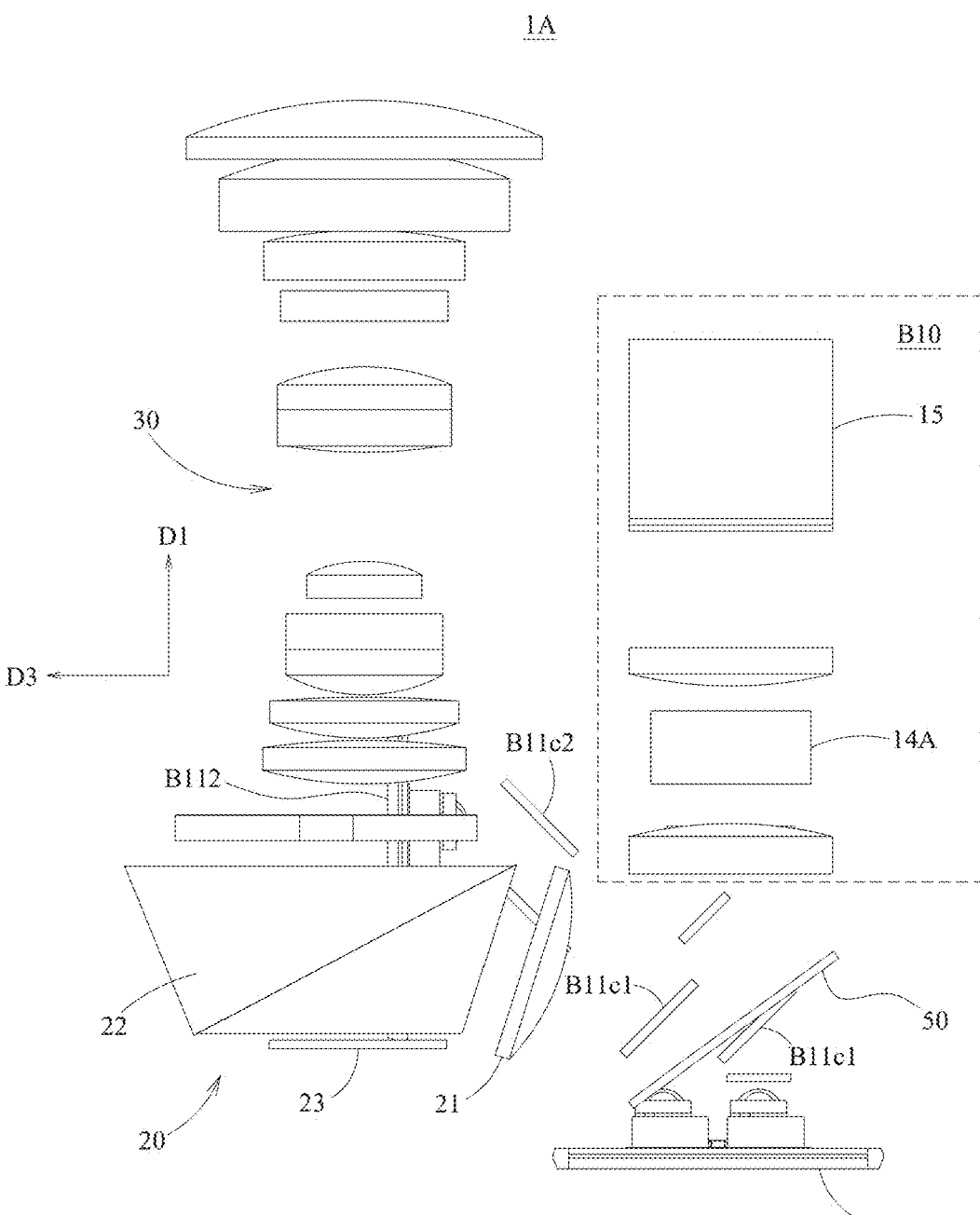
FIG. 11 is a top view of the projection apparatus of FIG. 8.

The fifth reflecting element 51 of the third optical path folding unit 50 in the present embodiment folds the optical path of the illumination light LM, whereby the illumination light LM enter the light modulation module 20 along the third direction D3 and finally exit the projection apparatus 1A from the projecting lens 30. The third direction D3 is perpendicular to the first direction D1 and the second direction D2, wherein the second direction D2 and the third direction D3 define a second plane, and the first direction D1 and the third direction D3 define a third plane. Therefore, the first plane, the second plane and the third plane are orthogonal to each other. FIG. 9 illustrates the projection apparatus of FIG. 8 viewed along a direction orthogonal to the first plane, FIG. 10 illustrates the projection apparatus of FIG. 8 viewed along a direction orthogonal to the second plane, and FIG. 11 illustrates the projection apparatus of FIG. 8 viewed along a direction orthogonal to the third plane. In the projection apparatus 1A of the present embodiment, the optical path of the laser light beams L entering the light uniformization system B10 along the first direction D1, optical path of the light beams in the uniformization system B10 and the optical path of the illumination light LM exiting the light uniformization system B10 are located on the first plane defined by the first direction D1 and the second direction D2. The optical path of the illumination light LM exiting the light uniformization system B10 and the optical path of the image light LI is located on the third plane defined by the first direction D1 and the third direction D3.

Figure 8:
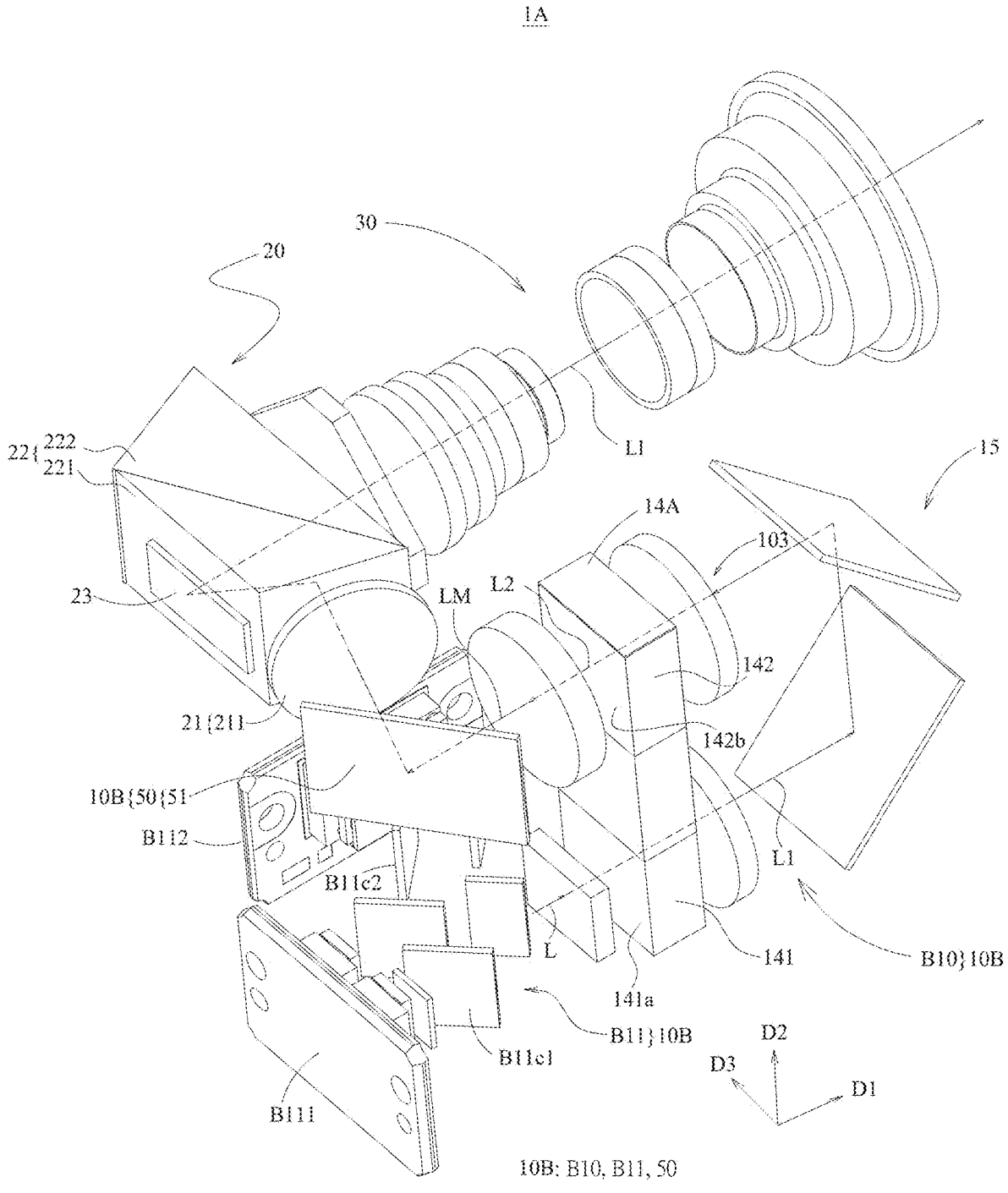
FIG. 8 is a perspective view of second embodiment of a projection apparatus of the present disclosure.
Figure 9:
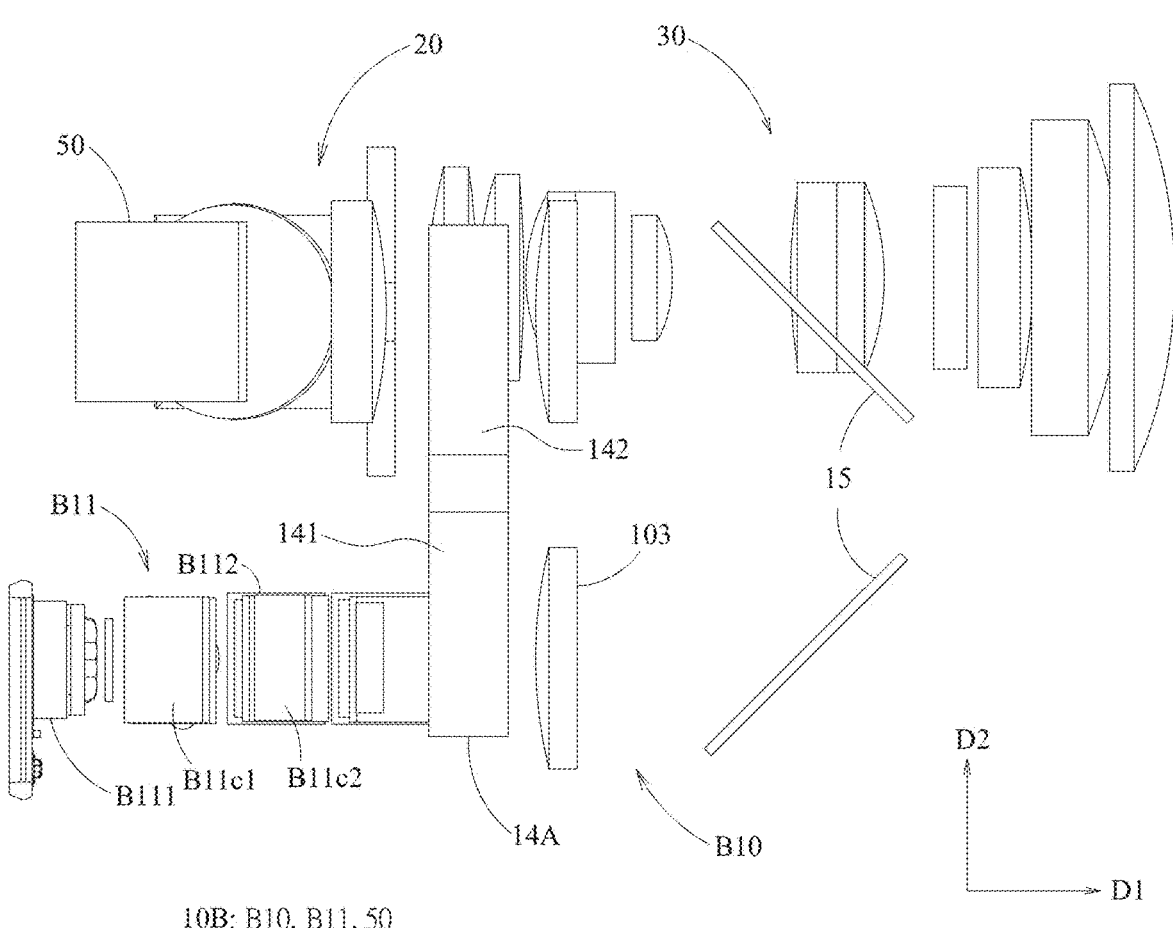
FIG. 9 is a side view of the projection apparatus of FIG. 8.

As shown in FIGS. 8, 9, the light uniformization system B10 and the light source module B11 are disposed on the first plane, and the orthographic projections of the light uniformization system B10 and the light source module B11 on the first plane do not overlap. The orthographic projections of the second array region 142 of the lens array element 14A of the light uniformization system B10 and the projecting lens 30 on the first plane at least partially overlap.

As shown in FIGS. 8, 10, the orthographic projections of the second light exiting surface 142b of the second array region 142 of the lens array element 14A and the light exiting surface of the projecting lens 30 on the second plane are arranged along the third direction D3. The orthographic projections of the second light exiting surface 142b of the second array region 142 of the lens array element 14A and the first light incident surface 141a of the first array region 141 are arranged along the second direction D2.

As shown in FIG. 11, the light modulation module 20 and the projecting lens 30 are disposed on the third plane, and the orthographic projections of the light modulation module 20 and the projecting lens 30 on the third plane do not overlap.

In the embodiments illustrated in FIGS. 8 to 11, the second direction D2 is parallel to the direction of gravity, while the first direction D1 and the third direction D3 are perpendicular to the direction of gravity. The first plane formed by the first direction D1 and the second direction D2 is a vertical plane and orthogonal to the horizontal plane. Therefore, on the second plane defined by the second direction D2 and the third direction D3, the light incident position of the laser light beams L in the light uniformization system B10 (or an orthographic projection of the laser light beams L on the first light incident surface 141a) and a light exiting position of the illumination light LM in the light uniformization system B10 are arranged along the vertical direction, and the light exiting position of the illumination light LM in the light uniformization system B10 and the light exiting position of the image light LI in the projecting lens 30 are arranged in the horizontal direction. For example, the light incident position of the laser light beams L in the light uniformization system B10 is located at the bottommost position, the light exiting position of the illumination light LM in the light uniformization system B10 are above the light incident position of the laser light beams L in the light uniformization system B10, and the light exiting position of the image light LI in the projecting lens 30 is on the left side of the light exiting position of the illumination light LM in the light uniformization system B10.

Figure 12:
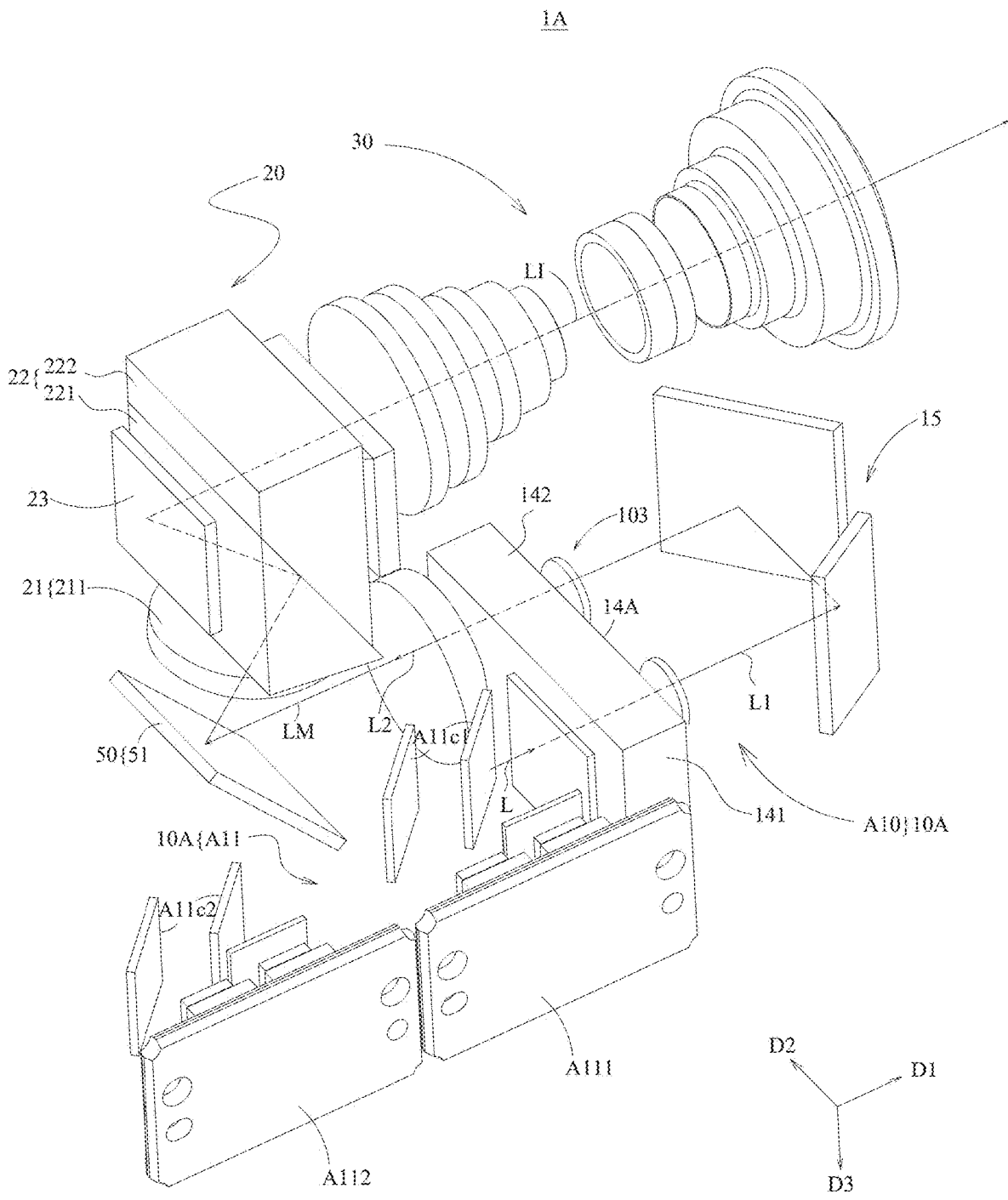
FIG. 12 is a perspective view of third embodiment of a projection apparatus of the present disclosure.

Referring to FIG. 12, another embodiment of a projection apparatus is disclosed. The present embodiment has a portion of the structures identical to the structures of the previous embodiment, and the identical elements are given the same numerical identifiers, so descriptions thereof are thus omitted.

In the present embodiment, the projection apparatus 1A includes an illumination system 10A. The illumination system 10A includes a light source module A11 and a light uniformization system A10. The light beams of different colors emitted by the laser light emitting units A111 and A112 enter the light combination elements A11c1 and A11c2. The light combination elements A11c1 and A11c2 combine the light beams and change the transmission direction of the light beams to form the laser light beams L, and the laser light beams L enter the light uniformization system A10 along the first direction D1, wherein the third direction D3 is parallel to the direction of gravity, and the first direction D1 and the second direction D2 are perpendicular to the direction of gravity. The first plane formed by the first direction D1 and the second direction D2 is a horizontal plane.

Therefore, on the second plane defined by the second direction D2 and the third direction D3, the light incident position of the laser light beams L in the light uniformization system A10 (or an orthographic projection of the laser light beams L on the first light incident surface 141a) and a light exiting position of the illumination light LM in the light uniformization system A10 are arranged along the horizontal direction, and the light exiting position of the illumination light LM in the light uniformization system A10 and the light exiting position of the image light LI in the projecting lens 30 are arranged in the vertical direction. For example, the light incident position of the laser light beams L in the light uniformization system A10 is located at the rightmost position, the light exiting position of the illumination light LM in the light uniformization system A10 is on the left side of the light incident position of the laser light beams L in the light uniformization system A10, and the light exiting position of the image light LI in the projecting lens 30 is above the light exiting position of the illumination light LM in the light uniformization system A10.

As aforementioned, the light uniformization system and the projection apparatus utilizing the same have at least one of the following advantageous effects. The integrally-structured lens array element can be manufactured with a single mold, and alignment and calibration are inherently accomplished by the manufacturing process meeting the design requirements. As no assembly process is needed for the integrally-structured lens array element, the manufacture cost is lowered and the manufacturing process is simplified. The integrally-structured lens array element has fewer elements, thereby reducing the size of the light engine. Moreover, the present disclosure utilizes the static lens array element to eliminate speckles of light spots of the laser light beams, and the number of movable diffusing elements is also reduced, thereby promoting reliability and the user experience.

Figure 13:
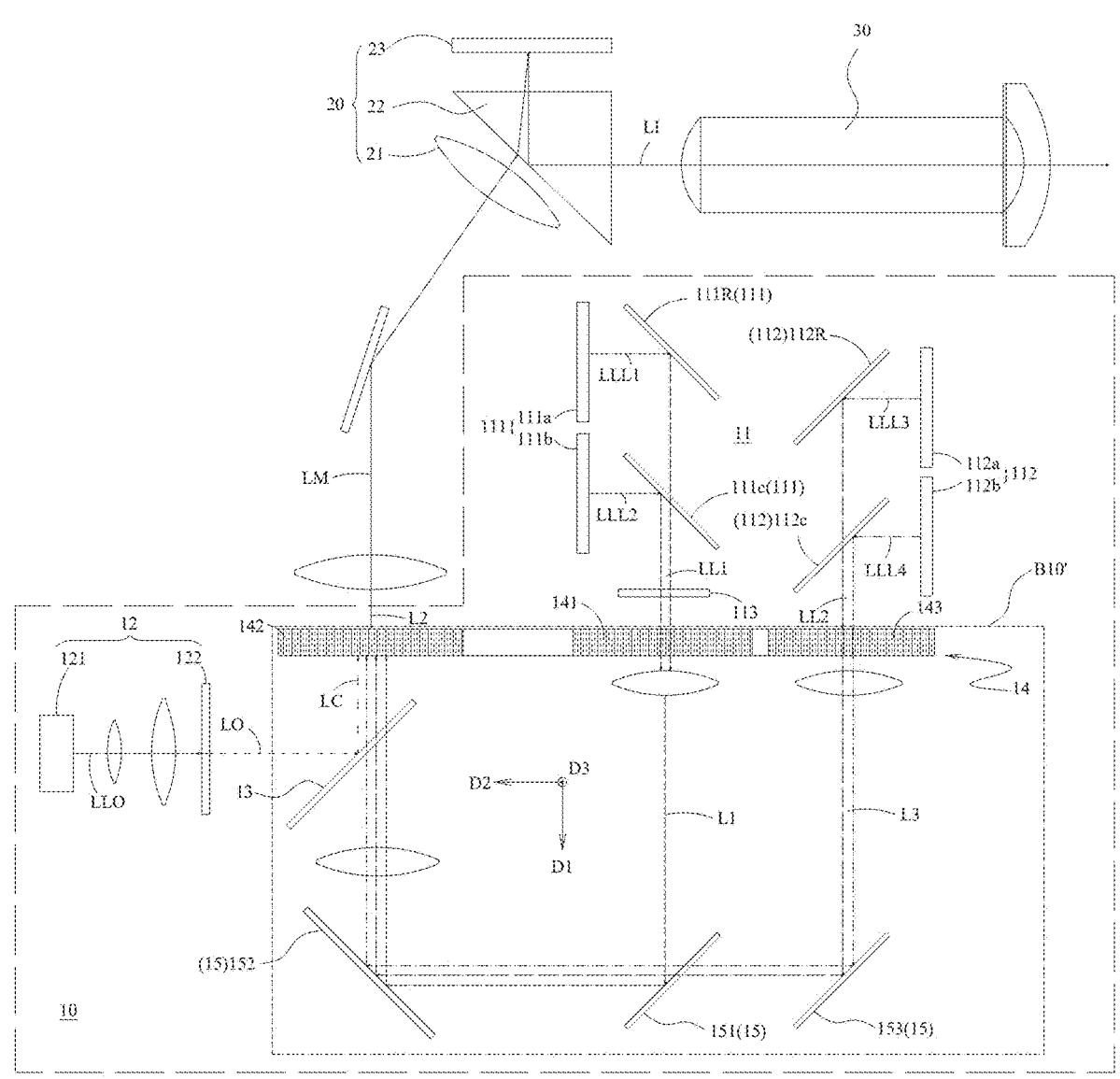
FIG. 13 is schematic view of a fourth embodiment of a projection apparatus of the present disclosure.

Referring to FIG. 13, a projection apparatus 1 includes an illumination system 10, a light modulation module 20 and a projection lens 30. The illumination system 10 generates an illumination light beam LM. The light modulation module 20 is disposed in an optical path of the illumination light LM to receive the illumination light LM and convert the illumination light LM into an image light LI. The projection lens 30 is disposed in an optical path of the image light LI and configured to project the image light LI to generate an image on a target (ex. a wall or a screen).

The light modulation module 20 includes an optical element 21, a prism element 22 and at least one light modulation element 23. The illumination light LM is transmitted to the optical element 21, the prism element 22 and the at least one light modulation element 23 sequentially.

The illumination light LM is converted to the image light LI through the at least one light modulation element 23, and the image beam LI propagates to the projection lens 30. The optical element 21 is a condensing lens, and the illumination light LM is condensed by the optical element 21 and enters the light modulation element 23. The light modulation element 23 exemplarily includes a digital micromirror device (DM D), a liquid crystal on silicon panel (LCoS Panel) or liquid crystal display (LCD). The present disclosure is not limited thereto.

The projection lens 30 includes one or a plurality of optical lenses having an identical diopter or different diopters. The optical lenses of the projection lens 30 are movable along an optical axis of the projection lens 30 for focusing, whereby the image light beam LI converted by the light modulation element 23 is imaged on a screen.

The illumination system 10 includes a light source module 11, an LED light source module 12, and the light uniformization system B10'. The light uniformization system B10' includes an optical path integration element 13, a lens array element 14 and an optical path bending unit 15.

Figure 14:
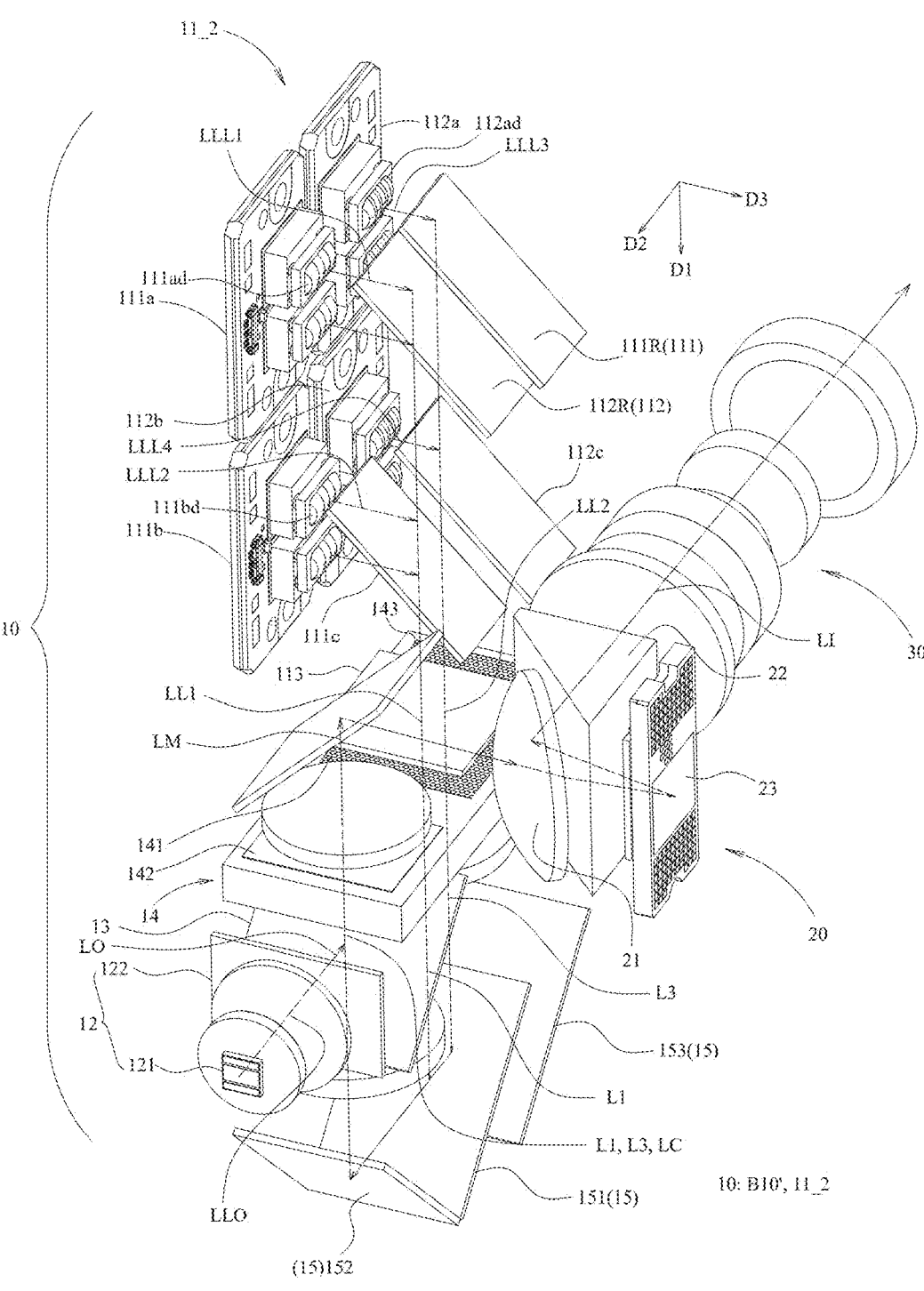
FIG. 14 is a perspective view of a fifth embodiment of a projection apparatus of the present disclosure.

Referring to FIGS. 13 and 14, the light source module 11 is a laser light source module. The light source module 11 includes a first laser light emitting unit 111. The first laser light emitting unit 111 is exemplarily a packing module. The first laser light emitting unit 111 emits a first laser light beams LL1 along a first direction D1. The LED light source module 12 emits an output light beam LO along a direction parallel to a second direction D2 and perpendicular to the first direction D1. The second direction D2 is parallel to an optical axis (not shown) of the projection lens 30.

The lens array element 14 includes a first array region 141 extending along the second direction D2 and a second array region 142 connected to the first array region 141 and extending along the second direction D2. The first array region 141 has a plurality of first micro lenses (not numbered), and the second array region 142 has a plurality of second micro lenses (not numbered). The first laser light beams LL1 penetrates the first array region 141 of the lens array element 14 to form a first light beam L1. The optical path integration element 13 is arranged in optical paths of the output light beam LO and the first light beam L1. The first light beam L1 from the first array region 141 and the output light beam LO of the LED light source module 12 are incident on the optical path integration element 13 at opposite sides. The first light bean L1 is guided by the optical path integration element 13 to pass through the second array region 142 of the lens array element 14, thereby forming a second light beam L2. The output light beam LO is guided by the optical path integration element 13 to from an output color light beam LC penetrating the second array region 142 of the lens array element 14. The illumination light LM includes at least one of the output color light beam LC and the second light beam L2.

The light source module 11 includes a first laser light emitting unit 111 and a second laser light emitting unit 112. The first laser light emitting unit 111 is described as above. FIG. 13B depicts the second laser beam member. The second laser beam member is a packaging module. The second laser light emitting unit 112 emits a second laser light beams LL2 along the first direction D1. Each of the second laser beams LL2 has a wavelength range different from that of each of the first laser light beams LL1. The first laser light emitting unit 111 is located more closed to the LED light source module 12 than the second laser light emitting unit 112.

The first embodiment has another arrangement. Referring to FIGS. 13, 13A, 13B, 14, 15, 16 and 17, the lens array element 14 includes a first array region 141, a second array region 142 and a third array region 143. The first array region 141 is dispose between the second array region 142 and the third array region 143, and the two opposite sides of the first array region 141 are respectively connected to the second array region 142 and the third array region 143. The first array region 141 has a plurality of first micro lenses (not numbered), the second array region 142 has a plurality of second micro lenses (not numbered), and the third array region 143 has a plurality of third micro lenses (not numbered).

The optical path bending unit 15 includes a first reflecting element 151, a second reflecting element 152 and a third reflecting element 153. The first reflecting element 151 is a dichroic mirror, and the second reflecting element 152 and the third reflecting element 153 are reflective mirrors. The first reflecting element 151 reflects a light beam having a greater wavelength, such as a red-light light beam, but allows a light beam having a smaller wavelength to pass, such as a blue-light beam or/and a green-light beam. The second reflecting element 152 and the third reflecting element 153 are capable of reflecting the light beams of all wavelengths.

A diffusion element 113 is disposed between the first array region 141 and the first laser light emitting unit 111. The first laser light beams LL1 traveling along the first direction D1 penetrates the diffusion element 113 before the first laser light beams LL1 enter the first array region 141 of the lens array element 14. The second laser light beams LL2 traveling along the first direction D1 enter the third array region 143 of the lens array element 14. The first micro lenses of the first array region 141 destroy the coherence of the first laser light beams LL1, whereby the first laser light beams LL1 are uniformized to form the first light beam L1. Similarly, the third micro lenses of the third array region 143 destroy the coherence of the second laser light beams LL2 to uniformize the second laser light beams LL2 so as to form the third light beam L3.

The optical path bending unit 15 is disposed in a travel path of the first light beam L1 and the third light beam L3. The first light beam L1 travels to the first reflecting element 151 along the second direction D2, and the first reflecting element 151 reflects the first light beam L1. The reflected first light beam L1 travels along a first transmission direction to penetrate the optical path integration element 13, wherein the first transmission direction is orthogonal with the second direction D2, and the first transmission direction and the first direction D1 are parallel but in opposite directions. The third light beam L3 travels to the third reflecting element 153, and the third reflecting element 153 reflects the third light beam L3. The reflected third light beam L3 penetrates the first reflecting element 151. The first light beam L1 of the embodiment is exemplarily a red laser beam, the third light beam L3 is exemplarily a blue laser beam or/and green laser beam.

The first light beam L1 or the third light beam L3 travels to the second reflecting element 152, and the second reflecting element 152 reflects the first light beam L1 or the third light beam L3. The reflected first light beam L1 or the reflected third light beam L3 enters the optical path integration element 13 along the first transmission direction. The optical path integration element 13 is a dichroic mirror or color splitting member. The first light beam L1 or/and the third light beam L3 penetrates the optical path integration element 13 to enter the second array region 142 of the lens array element 14. The output light beam LO from the LED light source module 12 enters the optical path integration element 13 along the direction parallel to and opposite to the second direction. The optical path integration element 13 reflects the output light beam LO to form the output color light beam LC traveling along the first transmission direction. The output color light beam LC enters the second array region 142 of the lens array element 14. The optical properties of the optical path integration element 13 are described in the following paragraphs.

The first light beam L1, the third light beam L3, and the output color light beam LC are uniformized again through the second array region 142 of the lens array element 14 to form the illumination light LM in different time sequences or in the same time sequences. The first laser light beams LL1 emitting from the light source module 11 penetrate the first array region 141 of the lens array element 14 to form the first light beam L1. The first light beam L1 passes through the second array region 142 to form a uniformized illumination light LM. Similarly, the second laser light beams LL2 from the light source module 11 pass through the third array region 143 of the lens array element 14 to form the third light beam L3. The third light beam L3 passes through the second array region 142 to from the uniformized illumination light LM. The output color light beam L C is obtained by the output light beam LO which emits from the LED light source module 12 and passes through the optical path integration element 13. The output color light beam LC passes through the second array region 142 of the lens array element 14 to form the uniformized illumination light LM.

Figure 13A:
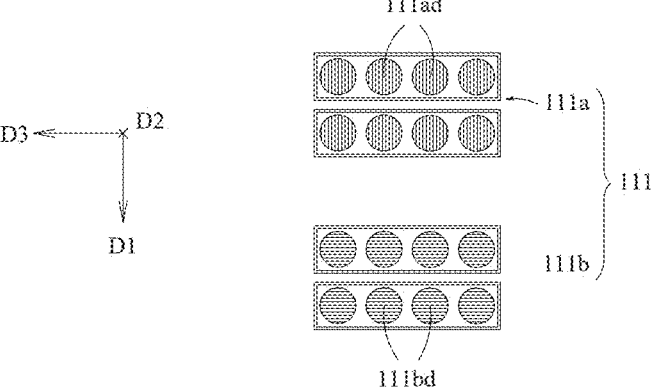
FIG. 13A is a schematic view of a first embodiment of a first laser member of the present disclosure.
Figure 13B:
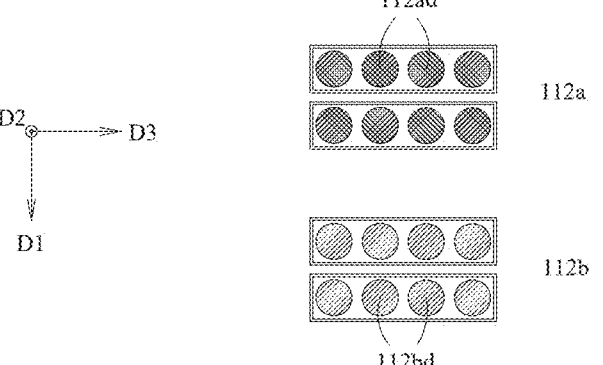
FIG. 13B is a schematic view of a first embodiment of a second laser member of the present disclosure.

Referring to FIGS. 13, 13A and 14, the first laser light emitting unit 111 includes a first light source element 111a, a second light source element 111b, a first laser light reflecting element 111R and a first light combining element 111c. The first light source element 111a emits a first output light beams LLL1, and the second light source element 111b emits a second output light beams LLL2. The first light source element 111a includes a plurality of first light emitting elements 111ad, which are for example laser diodes. The second light source element 111b includes a plurality of second light emitting elements 111bd, which are for example laser diodes. The first output light beams LLL1 of the present embodiment are composed of light beams emitting from at least a portion of the first light emitting elements 111ad, and the second output light beams LLL2 are composed of light beams emitting from at least a portion of the first light emitting elements 111bd. The first light emitting elements 111ad of the first light source element 111a are arranged in an array, such as an array of 4×2. The second light emitting elements 111bd of the second light source element 111b are arranged in another array, such as an array of 4×2. The first output light beams LLL1 and the second output light beams LL L2 are laser beams of identical wavelength range, for example a blue light laser beam and a green light laser beam. The first light combining element 111c is a stripe mirror. A portion of surfaces of the stripe mirror is provided with reflective coatings, and another portion of the surfaces allows the light beams to penetrate. The first laser light reflecting elements 111R is a reflective mirror.

In the arrangement shown in FIG. 13A, the first light source element 111a and the second light source element 111b of the first laser light emitting unit 111 are arranged along the first direction D1. The first light emitting elements 111ad of the first light source element 111a are arranged in two columns on a substrate along the first direction D1, and the first light emitting elements 111ad in each column are arranged along a third direction D3. The second light emitting elements 111bd of the second light source element 111b are arranged on a substrate along the first direction D1, and the second light emitting elements 111bd in each column are arranged along the third direction D3.

The first light source element 111a emits the first output light beams LLL1 along the direction parallel to and opposite to the second direction, the first output light beams LLL1 are reflected by the first laser light reflecting element 111R to enter the first light combining element 111c along the first direction D1 and pass through the first light combining element 111c along the first direction D1. The second light source element 111b emits the second output light beams LLL2 along the direction parallel to and opposite to the second direction. The second output light beams LLL2 travel to the first light combining element 111c. The first light combining element 111c reflects the second output light beams LLL2 to propagate along the first direction D1. Therefore, the first output light beams LLL1 and the second output light beams LLL2 are guided by the first light combining element 111c to travel along the same optical path, thereby forming the first laser light beams LL1 traveling along the first direction D1.

Referring to FIGS. 13 and 13B, the second laser light emitting unit 112 includes a third light source element 112a, a fourth light source element 112b, a second laser light reflecting element 112R and a second light combining element 112c. The third light source element 112a emits a third output light beams LLL3, and the fourth light source element 112b emits a fourth output light beams LLL4. The third light source element 112a includes a plurality of third light emitting elements 112ad, for example laser diodes. The fourth light source element 112b includes a plurality of fourth light emitting elements 112bd, for example laser diodes. The third output light beams LLL3 are composed of light beams emitting from at least a portion of third light emitting elements 112ad, and the fourth output light beams LLL4 are composed of light beams emitting from at least a portion of fourth light emitting elements 112bd. The third light emitting elements 112ad of the present embodiment are arranged in an array on a substrate, for example an array of 4×2. The fourth light emitting elements 112bd of the present embodiment are arranged in another array on a substrate, for example an array of 4×2. The third output light beams LLL3 and the fourth output light beams LLL4 are laser beams having different wavelength ranges. The third output light beams LLL3 is exemplarily a green-light laser beam, and the fourth output light beams LLL4 is exemplarily a blue-light laser beam. The disclosure is not limited thereto. In other embodiment, however, the third output light beams LLL3 and the fourth output light beams LLL4 are laser beams having the same wavelength scope, for example a red-light laser beam. The second light combining element 112c is a dichroic mirror, and the second laser light reflecting element 112R of the second laser light emitting unit 112 is a reflective mirror.

In the arrangement of FIGS. 13, 13B, the third light source element 112a and the fourth light source element 112b are arranged along the first direction D1. The third light emitting elements 112ad of the third light source element 112a are arranged in tow columns along the first direction D1 on a substrate. The third light emitting elements 112ad in each column are arranged along the third direction D3. The fourth light emitting elements 112bd of the fourth light source element 112b are arranged in tow columns along the first direction D1 on a substrate. The fourth light emitting elements 112bd in each column are arranged along the third direction D3.

The third light source element 112*a* emits the third output light beams LLL3 along the second direction D2. The second laser light reflecting element 112R reflects the third output light beams LLL3 to travel along the first direction D1 and pass through the second light combining element 112*c* along the first direction D1. The fourth light source element 112*b* emits the fourth output light beams LLL4 along the second direction D2. The fourth output light beams LLL4 are reflected by the second light combining element 112*c* to travel along the first direction D1. Therefore, the third output light beams LLL3 and the fourth output light beams LLL4 are guided by the second light combining element 112*c* to propagate along the same optical path, thereby forming the second laser light beams LL2 along the first direction D1.

The first laser light beams LL1 (for example a red-light laser beam) and the second laser light beams LL2 (for example a blue-light laser beam or/and a green-light laser beam) have different wavelength ranges.

As aforementioned, the first laser light beams LL1 and the second laser light beams LL2 pass through the first array region 141 and the third array region 143 to form the first light beam L1 and the third light beam L3. Therefore, the first light beam L1 and the first laser light beams LL1 have the same wavelength range, and the third light beam L3 and the second laser light beams LL2 have the same wavelength range.

Figure 15:
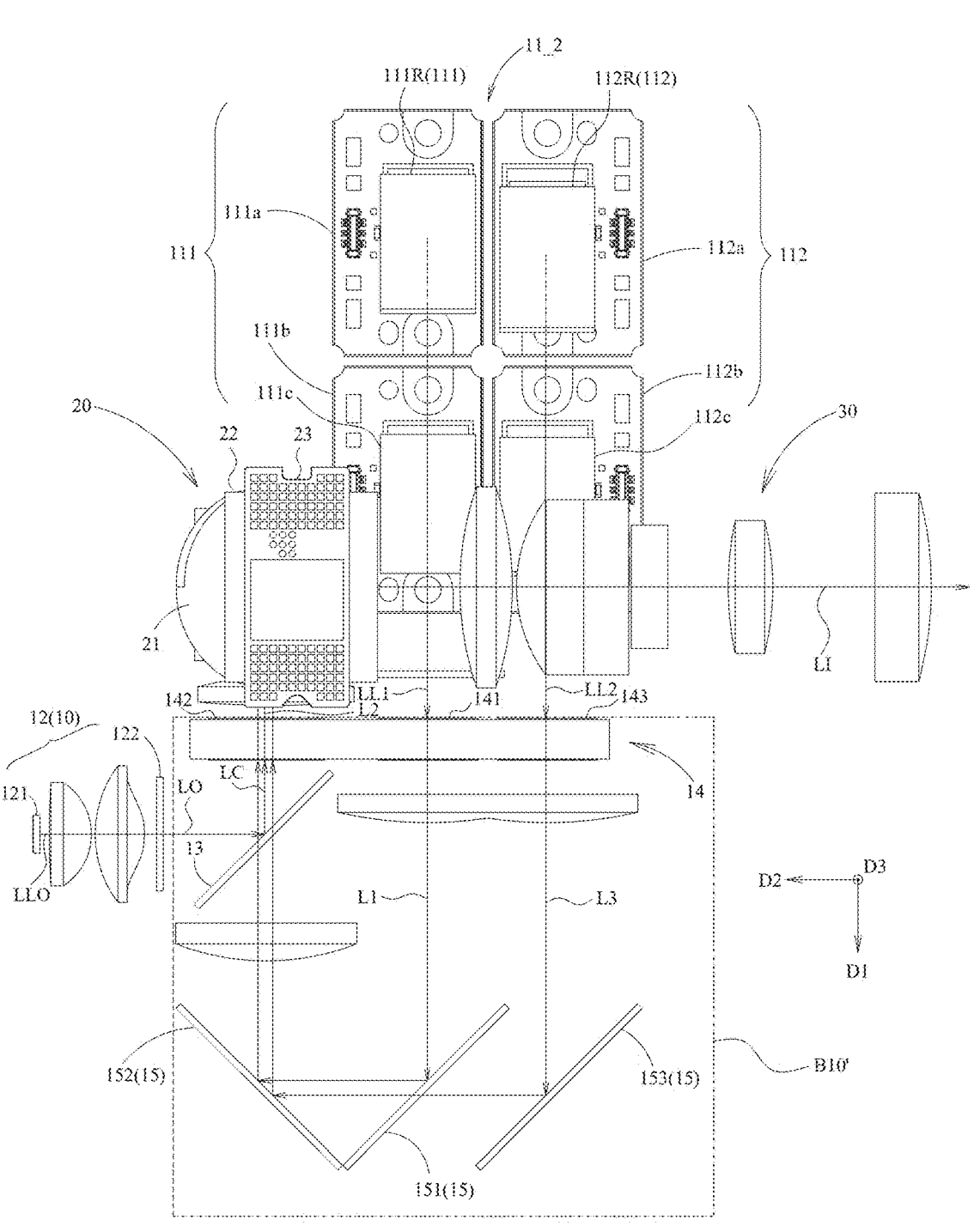
FIG. 15 is a side view of the fifth embodiment of the projection apparatus of the present disclosure.

Referring to FIGS. 14 and 15, as the projection apparatus 1 of the present embodiment has a portion of the features the same as that of the previous embodiment, an identical numerical is given to the corresponding elements, and the description is thus omitted. The illumination system 10 includes the light source module 11_2, the LED light source module 12, and the light uniformization system B10'. The light uniformization system B10' includes the optical path integration element 13, the lens array element 14 and the optical path bending unit 15. The projection apparatus 1 of the present embodiment differs from the previous embodiment in arrangement of the first laser light emitting unit 111 and the second laser light emitting unit 112 of the light source module 11_2. The first light source element 111*a* and the second light source element 111*b* of the first laser light emitting unit 111 are arranged along the first direction D1. The first light emitting elements 111*ad* of the first light source element 111*a* are arranged in tow columns along the first direction D1 on a substrate. The first light emitting elements 111*ad* in each column are arranged along the second direction D2. The second light emitting elements 111*bd* of the second light source element 111*b* are arranged in tow columns along the first direction D1 on a substrate. The second light emitting elements 111*bd* in each column are arranged along the second direction D2. The first light source element 111*a* emits the first output light beams LLL1 along the third direction D3. The first laser light reflecting element 111R reflects the first output light beams LLL1, and the reflected first output light beams LLL1 travel along the first direction D1 to pass through the first light combining element 111*c*. The second light source element 111*b* emits the second output light beams LLL2 along the third direction D3. The first light combining element 111*c* reflects the second output light beams LLL2, and the reflected second output light beams LLL2 travels along the first direction D1. Therefore, the first output light beams LLL1 and the second output light beams LLL2 are guided by the first light combining element 111*c* to travel along the same optical path, thereby forming the first laser light beams LL1 traveling along the first direction D1.

The third light source element 112*a* and the fourth light source element 112*b* are arranged along the first direction D1. The third light emitting elements 112*ad* of the third light source element 112*a* are arranged in tow columns along the first direction D1 on a substrate. The third light emitting elements 112*ad* in each column are arranged along the second direction D2. The fourth light emitting elements 112*bd* of the fourth light source element 112*b* are arranged in tow columns along the first direction D1 on a substrate. The fourth light emitting elements 112*bd* in each column are arranged along the second direction D2. The third light source element 112*a* emits the third output light beams LLL3 along the third direction D3. The second laser light reflecting element 112R reflects the third output light beams LLL3, and the reflected third output light beams LLL3 travel along the first direction D1 to pass through the second light combining element 112*c*. The fourth light source element 112*b* emits the fourth output light beams LLL4 along the third direction D3. The second light combining element 112*c* reflects the fourth output light beams LLL4, and the reflected fourth output light beams LLL4 travels along the first direction D1. Therefore, the third output light beams LLL3 and the fourth output light beams LLL4 are guided by the second light combining element 112*c* to travel along the same optical path, thereby forming the second laser light beams LL2 traveling along the first direction D1.

Figure 17:
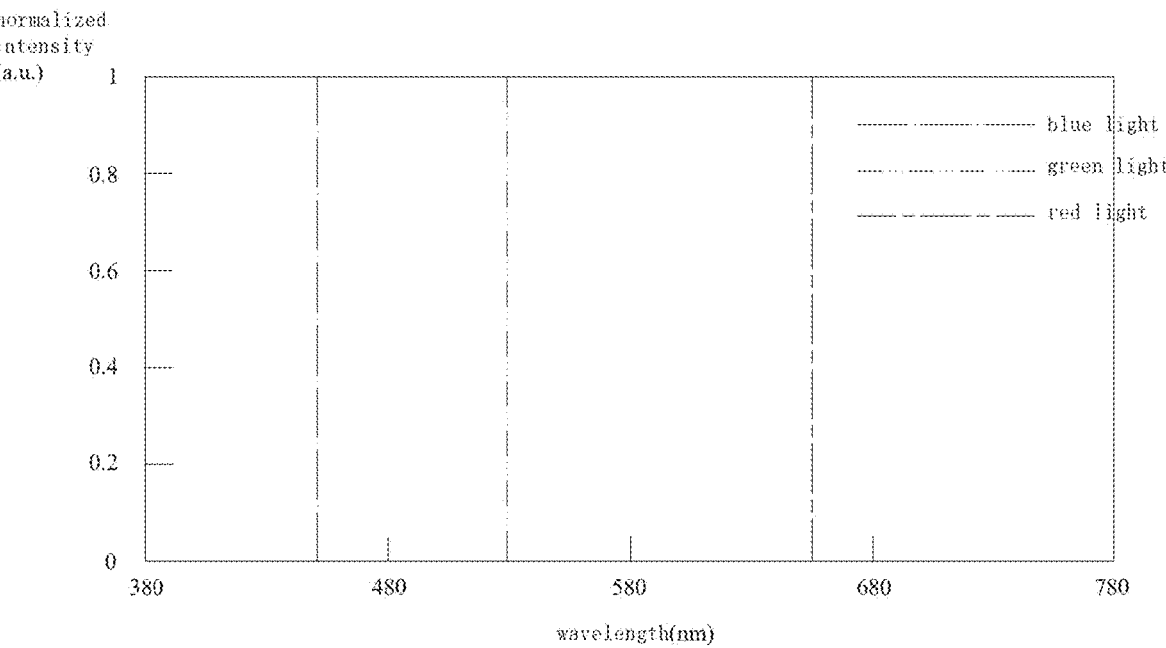
FIG. 17 is a light spectrum of a first light beam and a third light beam before it enters an optical path integration element.
Figure 18:
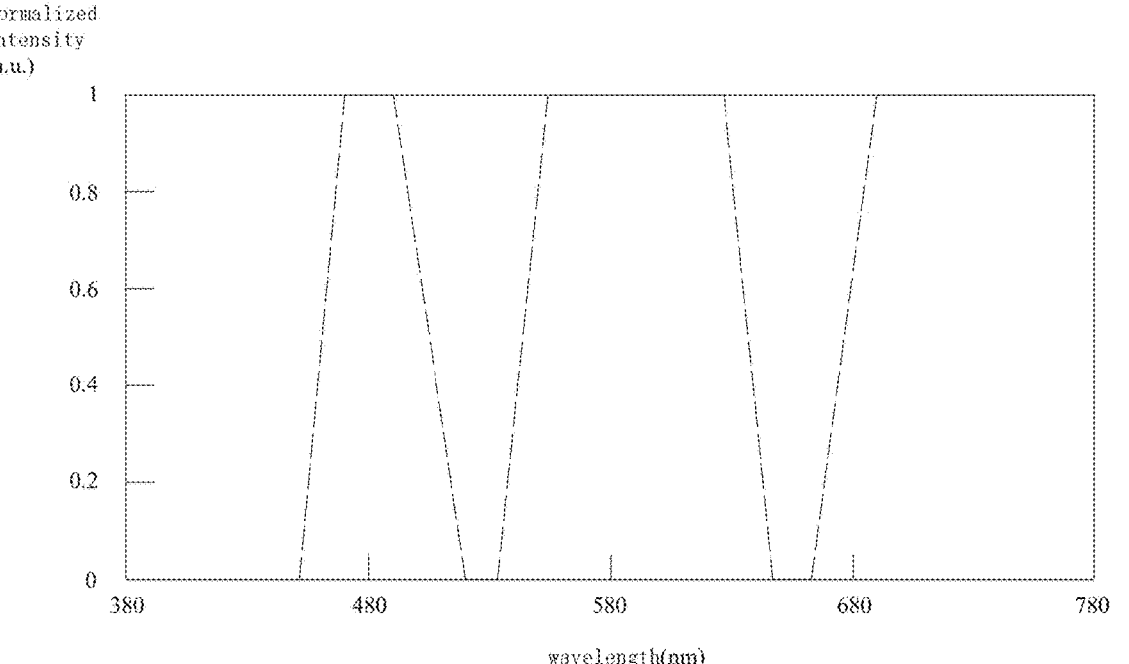
FIG. 18 is a light spectrum of light beams reflected by the optical path integration element.

Referring to FIGS. 17 and 18, in the fourth embodiment and the fifth embodiment, the optical path integration element 13 allows the red-light beam, the blue-light beam and the green-light beam to pass therethrough. The first light beam L1 is the red-light (laser) beam, the third light beam L3 is the blue-light (laser) beam or the green-light (laser) beam. Therefore, the first light beam L1 and the third light beam L3 are capable of passing through the optical path integration element 13.

Figure 19:
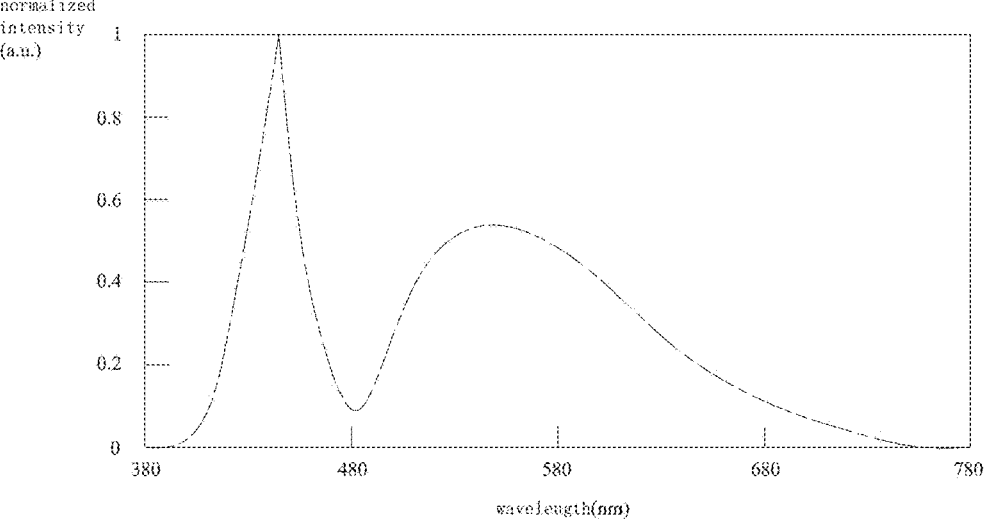
FIG. 19 is a light spectrum of the LED light beam generated by the LED light source element.
Figure 20:
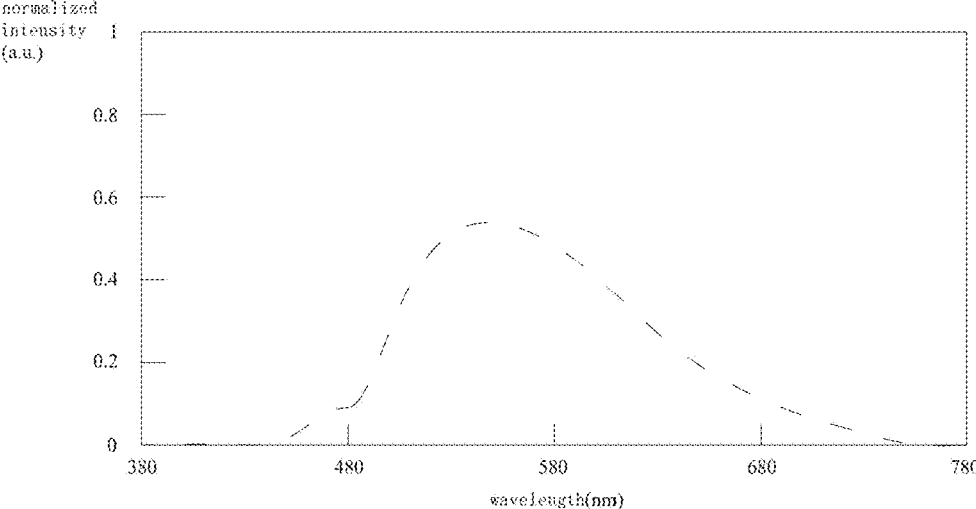
FIG. 20 is a light spectrum of an output light beam obtained by the LED light beam passing through the light filter.
Figure 21:
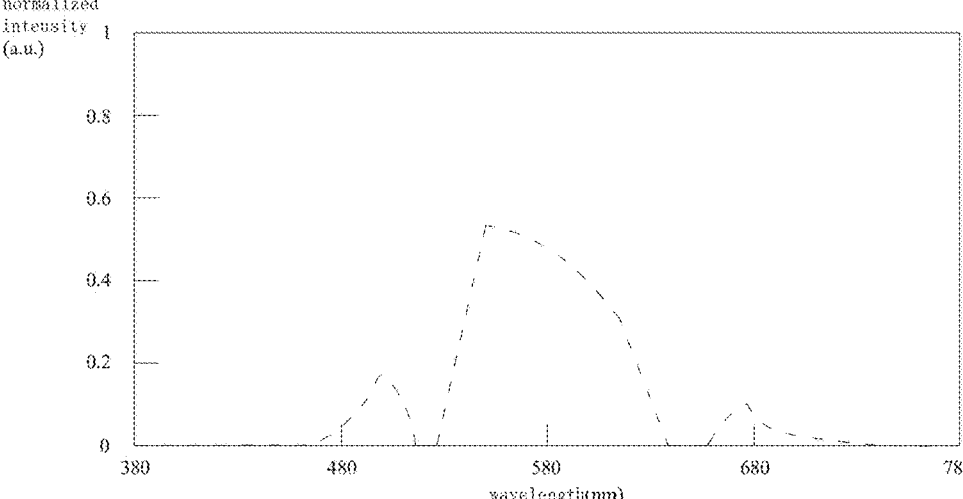
FIG. 21 is a light spectrum of an output color light beam after being reflected by the optical path integration element.

Referring to FIGS. 13 to 18, in the fourth embodiment and the fifth embodiment, the LED light source module 12 includes an LED light source element 121 and a light filter 122. The LED light source element 121 emits an LED light beam LLO. At least a portion of the LED light beam LLO passing through the light filter 122 to form the output light beam LO. FIG. 19 shows the light spectrum of the LED light beam LLO. FIG. 20 shows the light spectrum of the output light beam LO. FIG. 21 shows the light spectrum of the output color light beam LC. Referring to FIGS. 19, 20 and 21, the blue light having wavelength less than 480 nm of the LED light beam LLO is filtered by the light filter 122. That is the wavelength range of the LED light beam LLO includes the wavelength range of the output light beam LO. The blue light having wavelength less than 480 nm of the LED light beam LLO is also reflected back to the LED light source element 121 by the light filter 122. The optical path integration element 13 allows the first light beam L1 (red light) and the third light beam L3 (green light or/and blue light) to pass through. Therefore, the portion of the output light beam LO having the wavelength range overlapping the wavelength range of the first light beam L1 (red light) and the third light beam L3 is not reflected, whereby the output light beam LO has a wavelength range corresponding to a yellow light.

Therefore, the illumination light LM can be sequentially an uniformized light beam of the red-light laser beam and the yellow light beam, an uniformized light beam of the green light laser beam and the yellow light beam, and the uniformized blue light laser beam.

Figure 16:
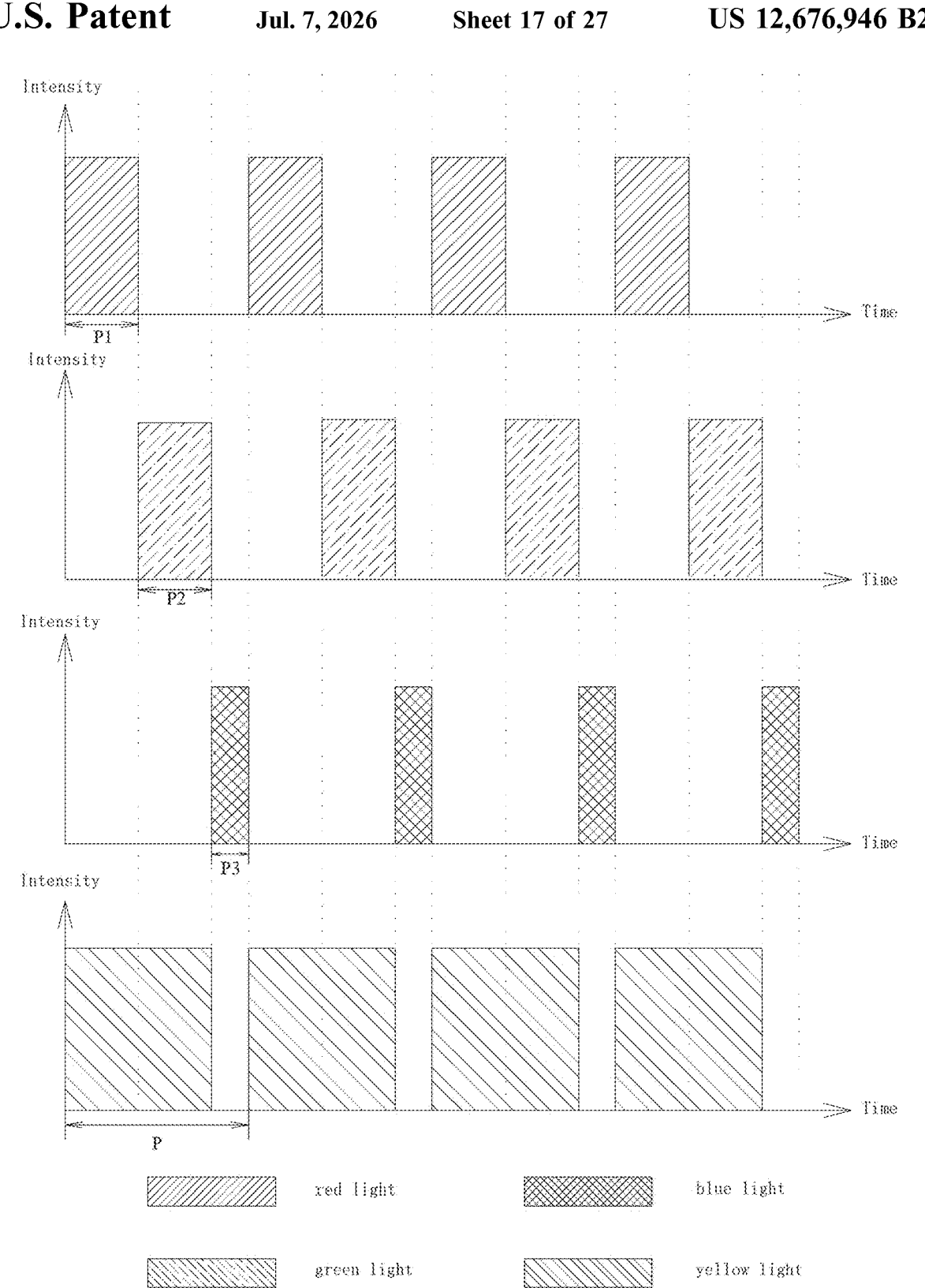
FIG. 16 is a timing diagram of a first output light beams, a second output light beams, a third output light beams, a fourth output light beams generated by the illumination system and a LED light beam generated by the LED light source element.

Referring to FIG. 16, a light emitting time period P includes a first time sequence P1, a second time sequence P2 and a third time sequence P3. The first laser light beams LL1, the third output light beams LLL3 as the second laser light beams LL2 and the fourth output light beams LLL4 as the second laser light beams LL2 emit during the first time sequence P1, the second time sequence P2 and the third time sequence P3 respectively. The first time sequence P1, the second time sequence P2 and the third time sequence P3 do not overlap. The third time sequence P3 of the light emitting time period P is continued by the first time sequence P1 of the next light emitting time period P. The output light beam LO is emitted during the first time sequence P1 and the second time sequence P2 except in the third time sequence P3.

In the first time sequence P1 of the light emitting time period P, the second laser light emitting unit 112 turns off, the first laser light emitting unit 111 turns off. The first laser light beams LL1 provided from the first laser light emitting unit 111 pass through the first array region 141 of the lens array element 14 to form the first light beam L1. The output light beam LO provided from the LED light source element 121 passes through the optical path integration element 13 to form the output color light beam LC. The first light beam L1 and the output color light beam L C pass through the second array region 142 of the lens array element 14 to form the illumination light LM (red light) in the time sequence.

In the second time sequence P2 of the light emitting time period P, the first laser light emitting unit 111 and the fourth light source element 112b of the second laser light emitting unit 112 both turn off. The third light source element 112a of the second laser light emitting unit 112 provides the third output light beams LLL3 as the second laser light beams LL2. The second laser light beams LL2 pass through the third array region 143 of the lens array element 14 to form the second light beam L2. The output light beam LO provided from the LED light source element 121 passes through the optical path integration element 13 to form the output color light beam LC. The second light beam L2 and the output color light beam LC pass through the second array region 142 of the lens array element 14 to form the illumination light LM (green light) in the time sequence.

In the third time sequence P3 of the light emitting time period P, the first laser light emitting unit 111, the LED light source element 121 and the third light source element 112a of the second laser light emitting unit 112 turn off. The fourth light source element 112b of the second laser light emitting unit 112 provides the fourth output light beams LLL4 as the second laser light beams LL2, and the second laser light beams LL2 pass through the third array region 143 of the lens array element 14 to form the second light beam L2. The second light beam L2 passes through the second array region 142 of the lens array element 14 to form the illumination light LM (blue light) in the time sequence.

In another embodiment, the light emitting time period P further includes a fourth time sequence continuing next to the third time sequence P3. The fourth time sequence is continued by the first time sequence P1 of the next light emitting time period P. The output light beam LO is emitted during the fourth time sequence. That is only the output light beam LO is provided during the fourth time sequence, but the first output light beams LLL1, the second output light beams LLL2, the third output light beams LLL3 and the fourth output light LLL4 beams are not provided.

Figure 22:
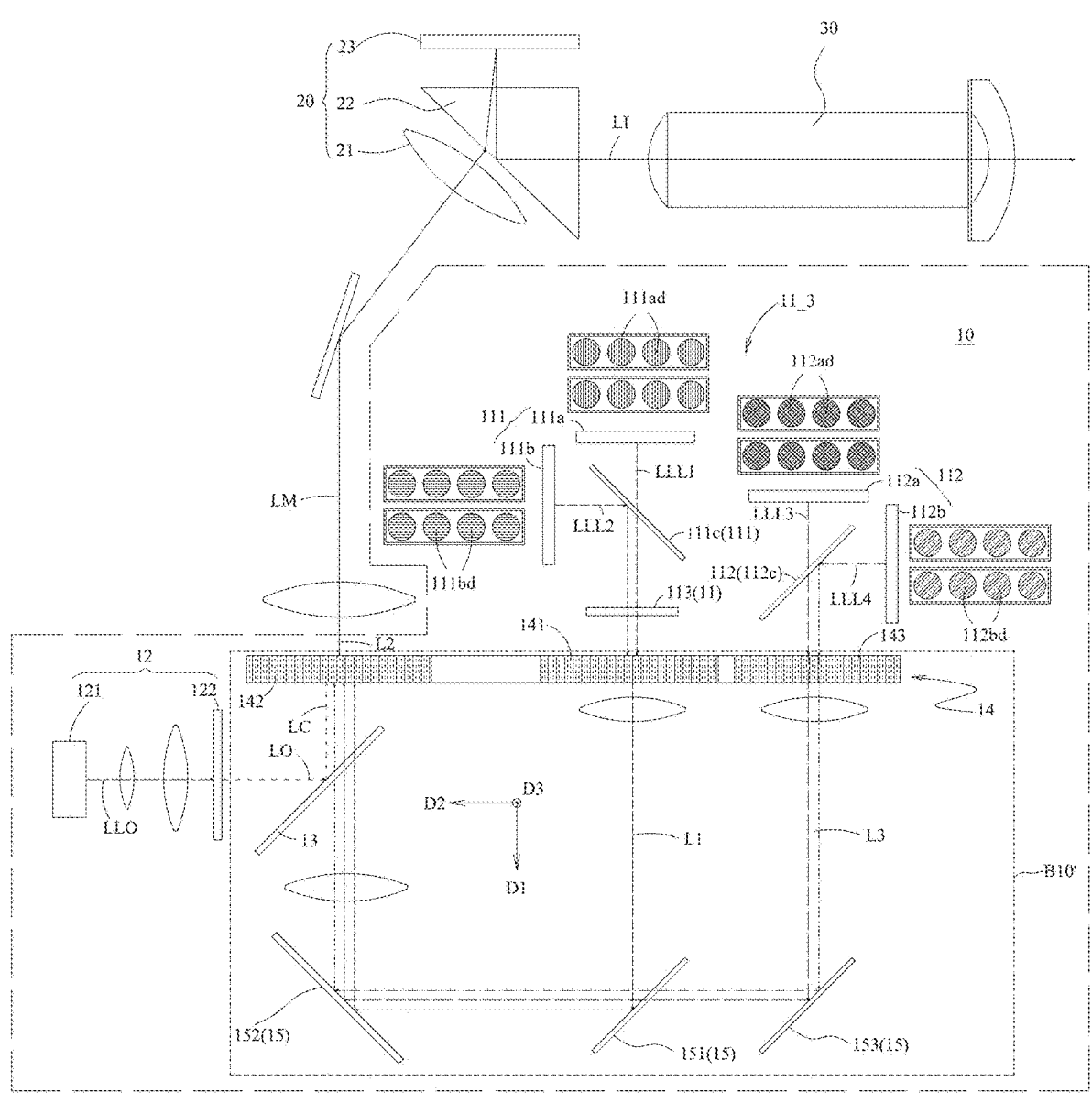
FIG. 22 is a schematic view of a sixth embodiment of a projection apparatus of the present disclosure.

Referring to FIG. 22, the projection apparatus of the present embodiment has a structure partially identical to the projection apparatus of the fourth embodiment, and therefore identical numerical are given to identical elements, and the descriptions thereof are thus omitted. The present embodiment differs from the fourth embodiment in that the light source module 11_3 of the illumination system 10 of the present embodiment is not provided with the first laser light reflecting element and a second laser light reflecting element. The first output light beams LLL1 of the first light source element 111a of the first laser light emitting unit 111 of the light source module 11_3 are directly emitted along the first direction D1 and enter the first light combining element 111c. Similarly, the third output light beams LLL3 of the third light source element 112a of the second laser light emitting unit 112 are directly emitted along the first direction D1 and enter the second light combining element 112c. Moreover, the light source elements shown in FIG. 22, for example, has an arrangement as follows. A plurality of first light emitting elements 111ad of the first light source element 111a in the first laser light emitting unit 111 are, for example, formed on a substrate and arranged in two columns along the third direction D3, and the first light emitting elements 111ad of each column are arranged along the second direction D2. The plurality of second light emitting elements 111bd of the second light source element 111b are, for example, formed on the substrate in two columns arranged along the third direction D3, and the second light emitting elements 111bd of each column are arranged along the first direction D1. The plurality of third light emitting elements 112ad of the third light source element 112a in the second laser light emitting unit 112 are, for example, formed on the substrate in two columns arranged along the third direction D3, and the third light emitting elements 112ad of each column are arranged along the second direction D2. The plurality of fourth light emitting elements 112bd of the fourth light source element 112b are, for example, formed on the substrate in two columns arranged along the third direction D3, and the fourth light emitting elements 112bd of each column are arranged along the first direction D1.

Figure 23:
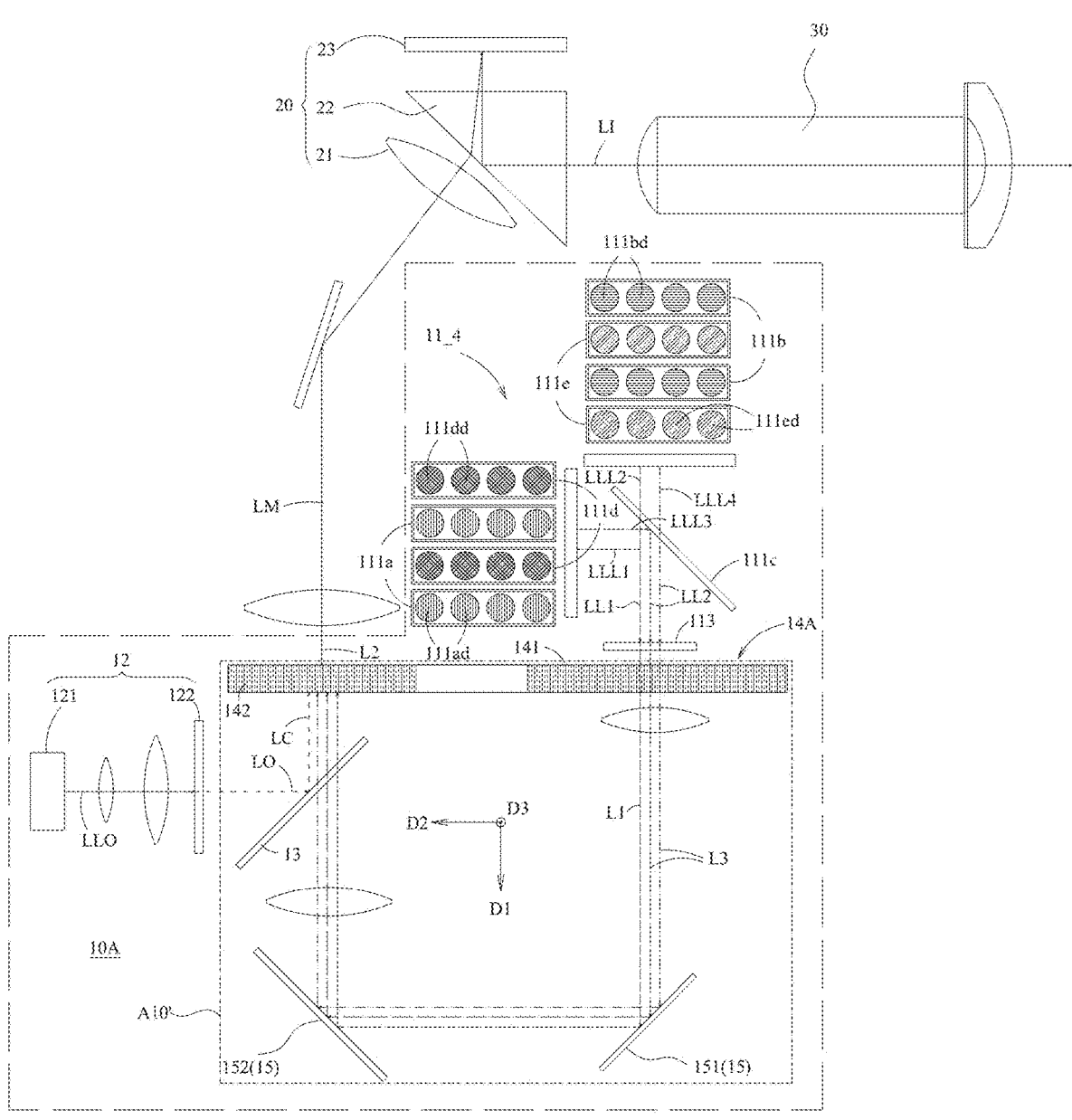
FIG. 23 is a schematic view of a seventh embodiment of a projection apparatus of the present disclosure.

Please refer to FIG. 23, the projection apparatus of the present embodiment has a structure partially identical to the projection apparatus of the fourth embodiment, and therefore identical numerical are given to identical elements and the descriptions thereof are thus omitted. The illumination system 10A includes a light source module 11_4, the LED light source module 12, and the light uniformization system A10'. The light uniformization system A10' includes the optical path integration element 13, the lens array element 14A and the optical path bending unit 15. The projection apparatus of this embodiment differs from the fifth embodiment in that the light source module 11_4 of the illumination system 10A of this embodiment includes the first light source element 111a, the second light source element 112b, the third light source element 111d and the fourth light source element 111e in addition to the first light source element 111a and the second light source element 111b. The third light source element 111d emits the third output light beams LLL3, and the fourth light source element 111e emits the fourth output light beams LLL4. Moreover, the first light emitting elements 111ad of the first light source element 111a and the third light emitting elements 111dd of the third light source element 111d of the present embodiment are arranged alternately on a substrate to form an array, such as a 4×4 array. The second light emitting elements 111bd of the second light source element 111b and the fourth light emitting elements 111ed of the fourth light source element 111e are arranged alternately on a substrate to form an array, such as a 4×4 array. The first output light beams LLL1 of the first light source element 111a and the third output light beams LLL3 of the third light source element 111d travel to the first light combining element 111c along the second direction D2 and then reflected by the first light combining element 111c, and the second output light beams LLL2 of the second light source element 111b and the fourth output light beams LLL4 of the fourth light source element 111e travel to the first light combining element 111c along the first direction D1 and pass through the first light combining element 111c. The first output light beams LLL1 and the second output light beams LLL2 form a first laser light beams LL1 in the first light combining element 111c, and the third output light beams LLL3 and the fourth output light beams LLL4 form a second laser light beams LL2 in the first light combining element 111c. The first laser light beams LL1 and the second laser light beams LL2 of the present embodiment both pass through the first array region 141 of the lens array element 14A. Therefore, the present embodiment is not provided with a second light combining element, and the lens array element 14A only includes a first array region 141 and a second array region 142, which can simplify the structure of the illumination system 10A.

Figure 24:
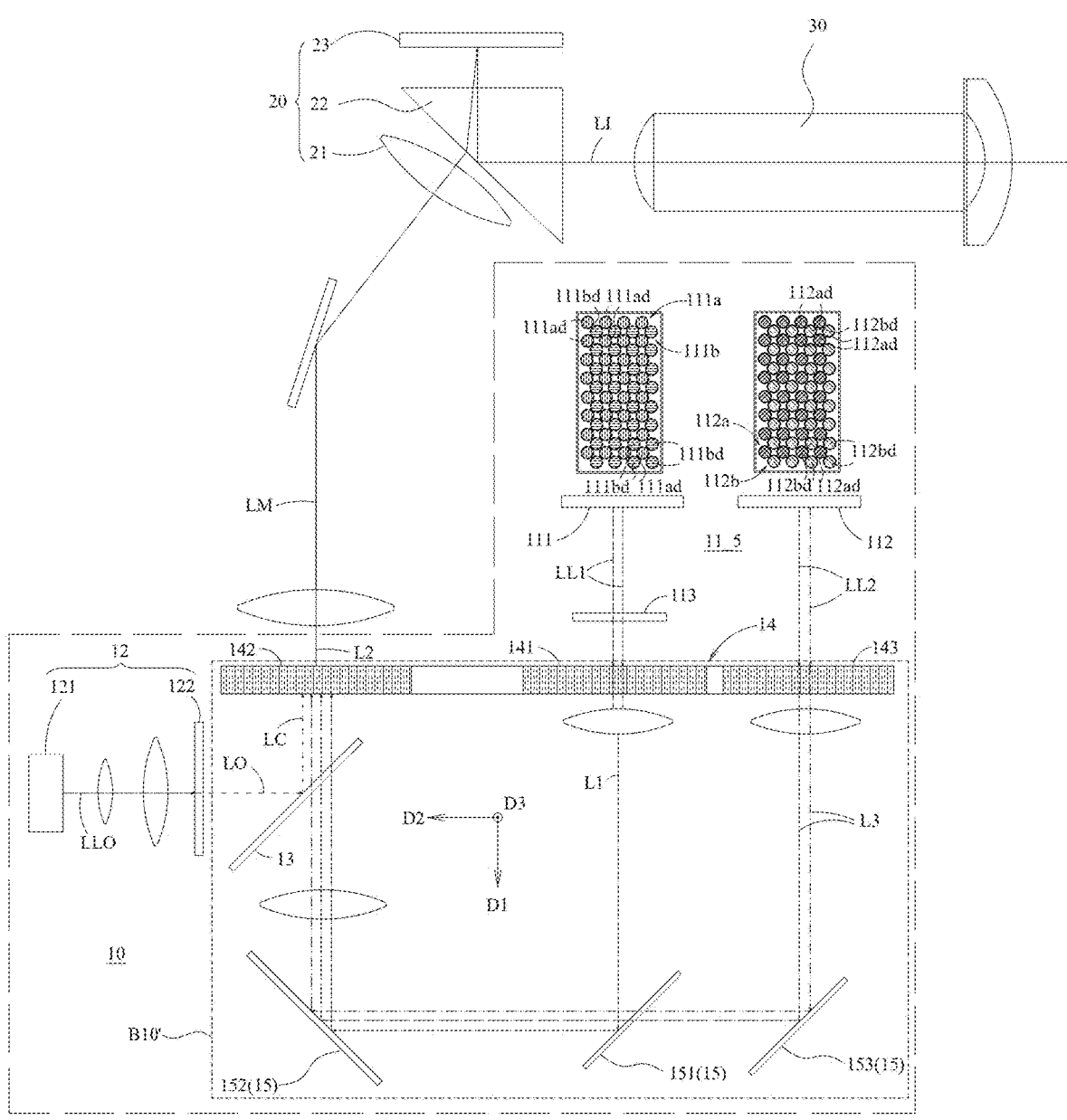
FIG. 24 is a schematic view of an eighth embodiment of a projection apparatus of the present disclosure.

Referring to FIG. 24, the projection apparatus of the present embodiment has a structure partially identical to the projection apparatus of the sixth embodiment, and therefore identical numerical are given to identical elements and the descriptions thereof are thus omitted. The illumination system 10 includes a light source module 11_5, the LED light source module 12, and the light uniformization system B10'. The light uniformization system B10' includes the optical path integration element 13, the lens array element 14 and the optical path bending unit 15. The projection apparatus of the present embodiment differs from the sixth embodiment in that a first light combining element is not provided in the first laser light emitting unit 111 in the light source module 11_5 of the present embodiment, and a plurality of first light emitting elements 111ad of the first light source element 111a and a plurality of second light emitting elements 111bd of the second light source element 111b are arranged alternately with each other on a substrate to form an array, and each of the first light emitting elements 111ad is surrounded by four of the second light emitting elements 111bd, and each of the second light emitting elements 111bd is also surrounded by four of the first light emitting elements 111ad to form a compact arranged structure. A second light combining element is not provided in the second laser light emitting unit 112, and the plurality of first light emitting elements 112ad of the third light source element 112a and the plurality of fourth light emitting elements 112bd of the fourth light source element 112b are arranged alternately on a substrate to form an array, and each of the third light emitting elements 112ad is surrounded by four of the fourth light emitting elements 112bd, and each of the fourth light emitting elements 112bd is also surrounded by four of the third light emitting elements 112ad to form a compact arranged structure.

Figure 25:
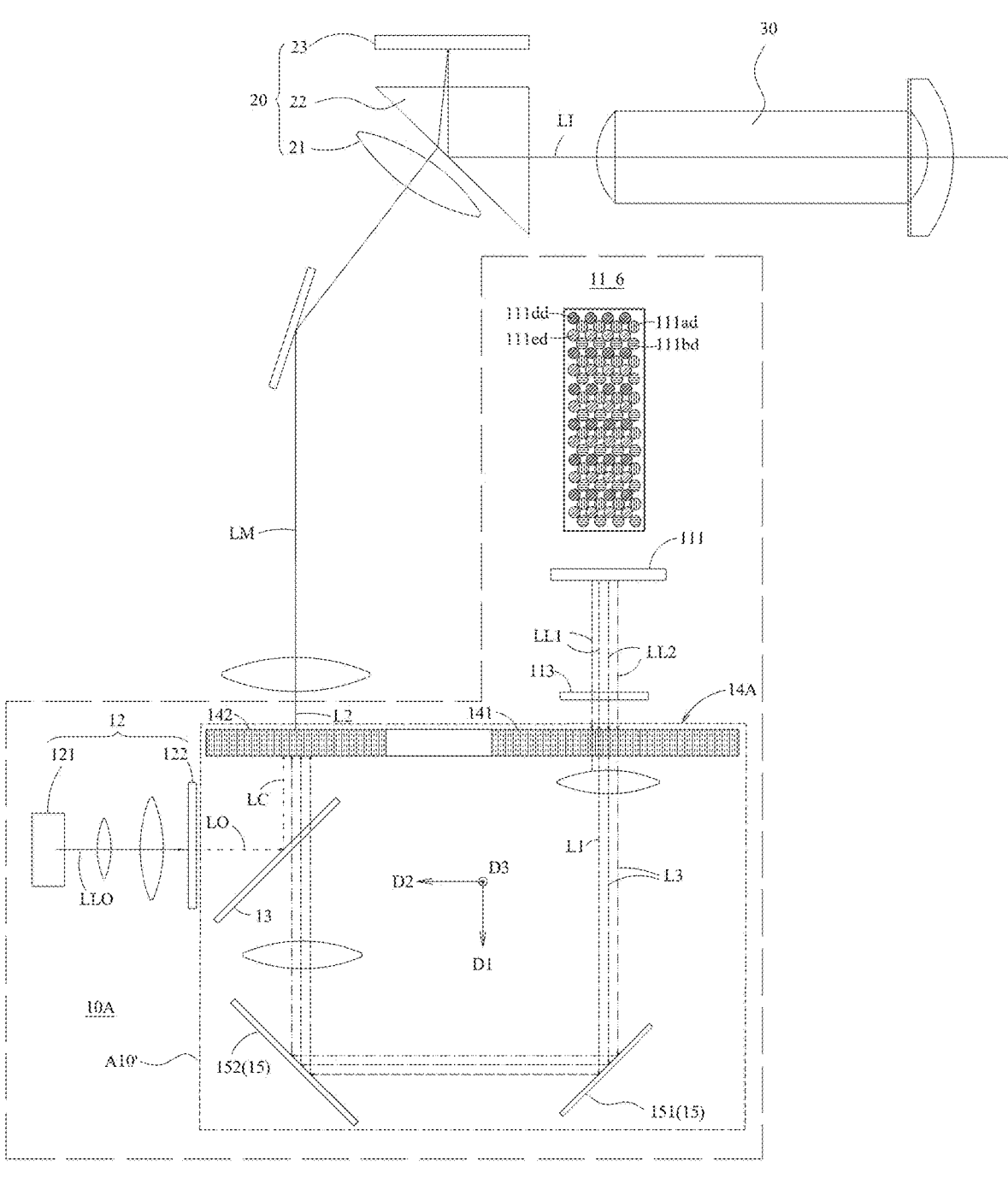
FIG. 25 is a schematic view of a ninth embodiment of a projection apparatus of the present disclosure.

Please refer to FIG. 25, the projection apparatus of the present embodiment has a structure partially identical to the projection apparatus of the seventh embodiment, and therefore identical numerical are given to identical elements and the descriptions thereof are thus omitted. The devices have partially the same structure, so the same elements are given the same symbols and their description is omitted. The illumination system 10A includes a light source module 11_6, the LED light source module 12, and the light uniformization system A10'. The light uniformization system A10' includes the optical path integration element 13, the lens array element 14A and the optical path bending unit 15. The projection apparatus of the present embodiment differs from the fourth embodiment in that the light source module 11_6 of the illumination system 10A of the present embodiment is not provided with the first light combining element, and the first laser light emitting unit 111 includes the plurality of the first light emitting elements 111ad of the first light source element 111a, the plurality of the second light emitting elements 111bd of the second light source element 111b, the plurality of the third light emitting elements 111dd of the third light source element 111d and the plurality of the fourth light emitting elements 111ed of the fourth light source element 111e. The plurality of the first light emitting elements 111ad of the first light source element 111a, the plurality of the second light emitting elements 111bd of the second light source element 111b, the plurality of the third light emitting elements 111dd of the third light source element 111d and the plurality of the fourth light emitting elements 111ed of the fourth light source element 111e in the light source module 11_6 are arranged alternately in pairs to form an array as a whole on a substrate, each of the first light emitting elements 111ad is surrounded by two of the third light emitting elements 111dd and two of the fourth light emitting elements 111ed, each of the second light emitting elements 111bd is surrounded by two of the third light emitting elements 111dd and two of the fourth light emitting elements 111ed, each of the third light emitting elements 111dd is surrounded by two of the first light emitting elements 111ad and two of the second light emitting elements 111bd, and each of the fourth light emitting elements 111ed is surrounded by two of the first light emitting elements 111ad and two of the second light emitting elements 111bd. The lens array element 14A of this embodiment is the same as the lens array element 14A of FIG. 1.

Figure 26:
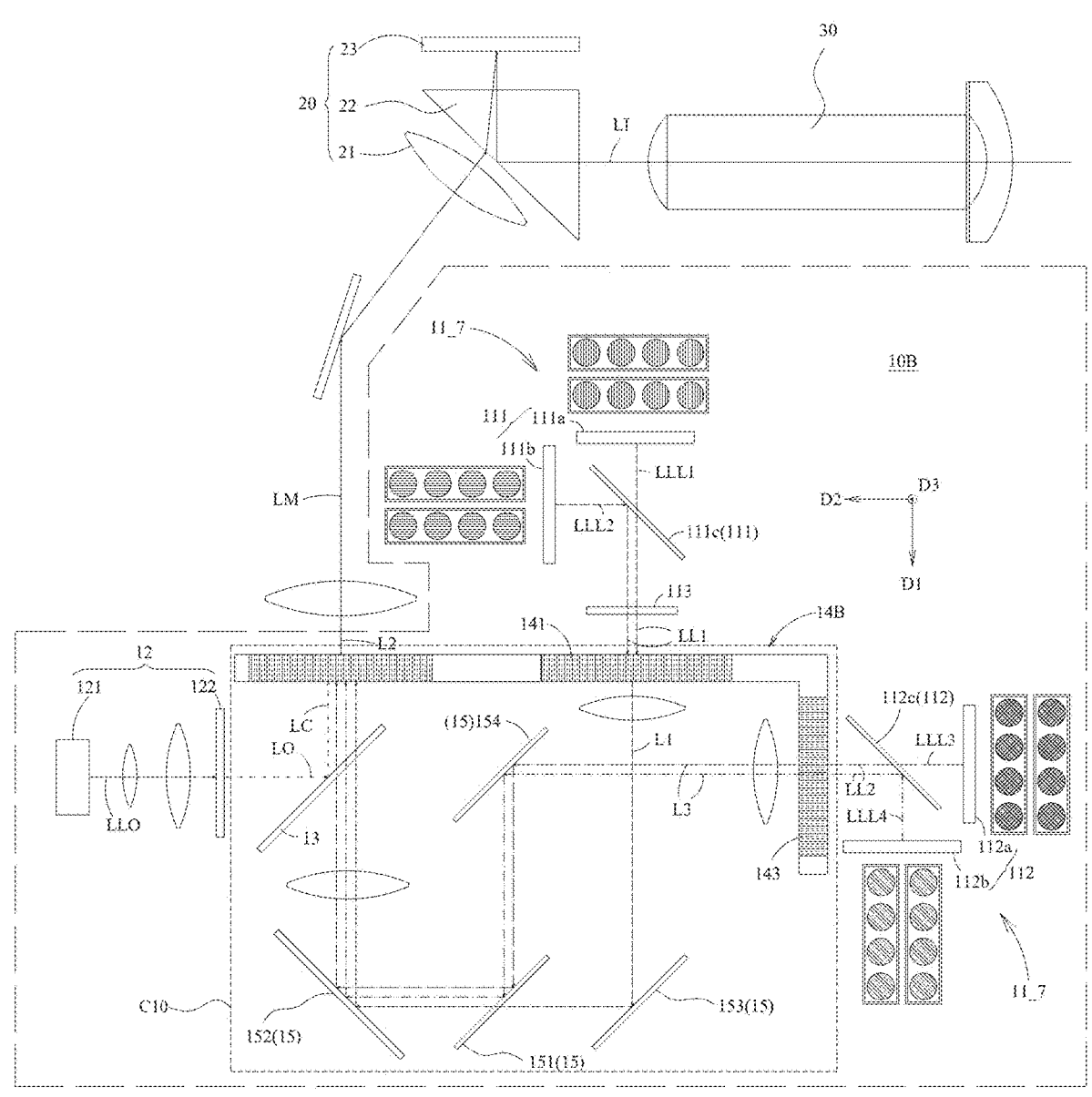
FIG. 26 is a schematic view of a tenth embodiment of a projection apparatus of the present disclosure.

Referring to FIG. 26, the projection apparatus of the present embodiment has a structure partially identical to the projection apparatus of the first embodiment, and therefore identical numerical are given to identical elements and the descriptions thereof are thus omitted. The illumination system 10B includes a light source module 11_7, the LED light source module 12, and the light uniformization system C10. The light uniformization system C10 includes the optical path integration element 13, a lens array element 14B and the optical path bending unit 15. The projection apparatus of the present embodiment differs from the first embodiment in that the third array region 143 of the lens array element 14B of the uniformization light system C10 of the illumination system 10B of this embodiment extends along the first direction D1 and is connected to the first array region 141, that is, the plurality of third micro lenses of the third array region 143 form a lens array on the plane defined by the first direction D1 and the third direction D3, and the first array region 141 and the second array region 142 are arranged along the second direction D2, that is, the lens array element 14B of this embodiment presents an L shape. The second laser light emitting unit 112 of the light source module 11_7 is arranged corresponding to the third array region 143, and the second laser light beams LL2 of the second laser light emitting unit 112 enter the third array region 143 along the second direction D2 to generate a uniform third light beam L3, and the third light beam L3 is reflected by the fourth reflector 154 and travels to the first reflecting element 151 along the second direction D2. In addition, the arrangement of the light source elements shown in FIG. 14 is, for example, as follows: the plurality of first light emitting elements 111ad of the first light source element 111a in the first laser light emitting unit 111 are, for example, formed on the substrate in two columns arranged along the third direction D3, and the first light emitting elements 111ad in each column are arranged along the second direction D2.

The plurality of second light emitting elements 111*bd* of the second light source element 111*b* are, for example, formed on the substrate in two columns arranged along the third direction D3, and the second light emitting elements 111*bd* in each column are arranged along the first direction D1. The plurality of third light emitting elements 112*ad* of the third light source element 112*a* in the second laser light emitting unit 112 are, for example, formed on the substrate in two columns arranged along the third direction D3, and the third light emitting elements 112*ad* in each column are arranged along the first direction D1. The plurality of fourth light emitting elements 112*bd* of the fourth light source element 112*b* are, for example, formed on the substrate in two columns arranged along the third direction D3, and the fourth light emitting elements 112*bd* in each column are arranged along the second direction D2.

Figure 27:
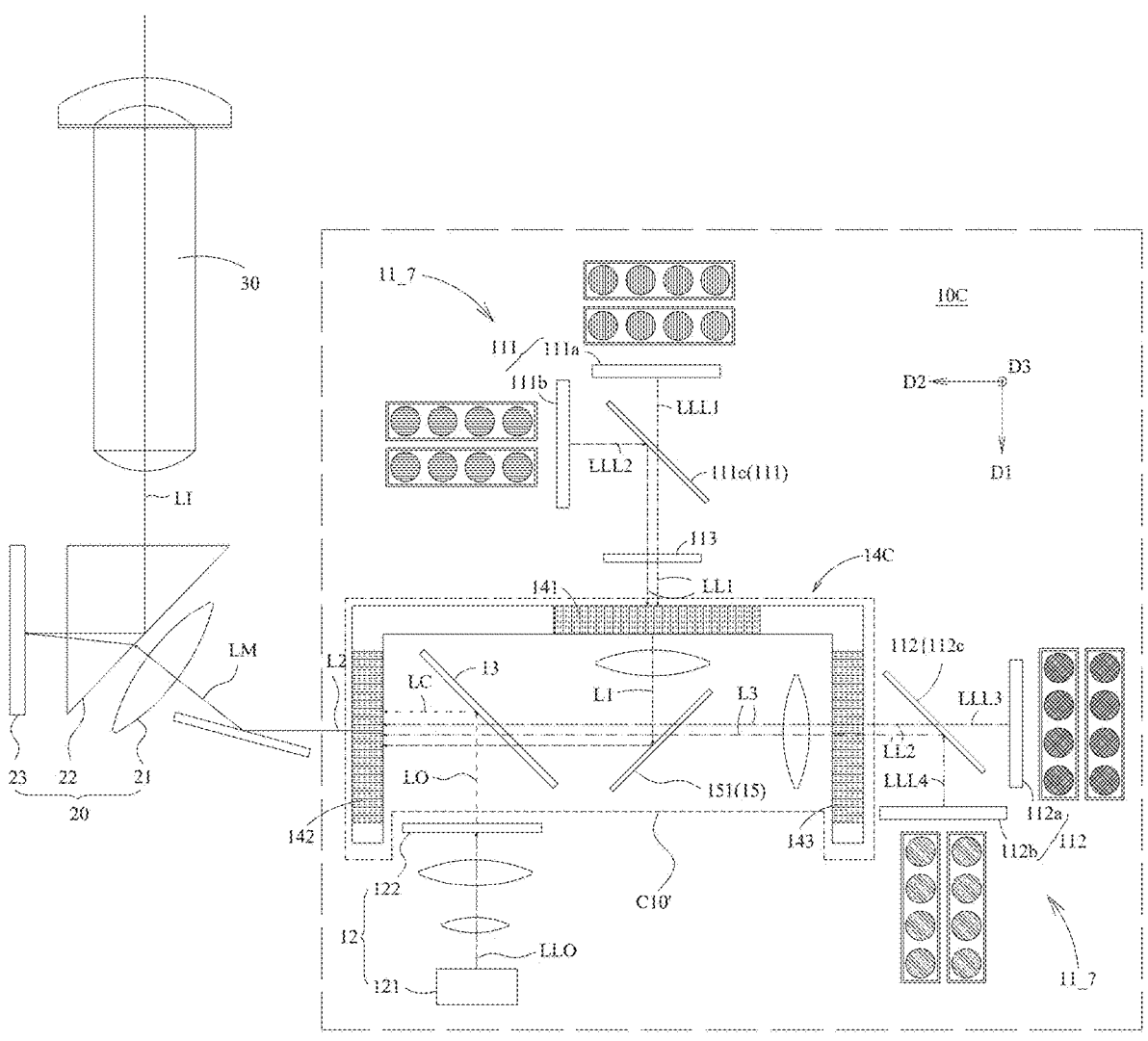
FIG. 27 is a schematic view of an eleventh embodiment of a projection apparatus of the present disclosure.

Referring to FIG. 27, the projection apparatus of the present embodiment has a structure partially identical to the projection apparatus of the first embodiment, and therefore identical numerical are given to identical elements and the descriptions thereof are thus omitted. The illumination system 10C includes a light source module 11_7, the LED light source module 12, and the light uniformization system C10'. The light uniformization system C10' includes the optical path integration element 13, a lens array element 14C and the optical path bending unit 15. The projection apparatus of the present embodiment differs from the seventh embodiment in that the second array region 142 and the third array region 143 of the lens array element 14C in the light uniformization system C10' of the illumination system 10C of the present embodiment both extend along the first direction D1 and connected to the opposite sides of the first array region 141, that is, the lens array element 14C of this embodiment is U-shaped. That is, the plurality of the second micro lenses of the second array region 142 form a lens array on the plane defined by the first direction D1 and the third direction D3, the plurality of the third micro lenses of the third array region 143 form another lens array on the plane defined by the first direction D1 and the third direction D3, and the plurality of the first micro lenses of the first array region 141 form a lens array on the plane formed by the second direction D2 and the third direction D3. Moreover, the optical path bending unit 15 of this embodiment is only provided with the first reflecting element 151.

Figure 28:
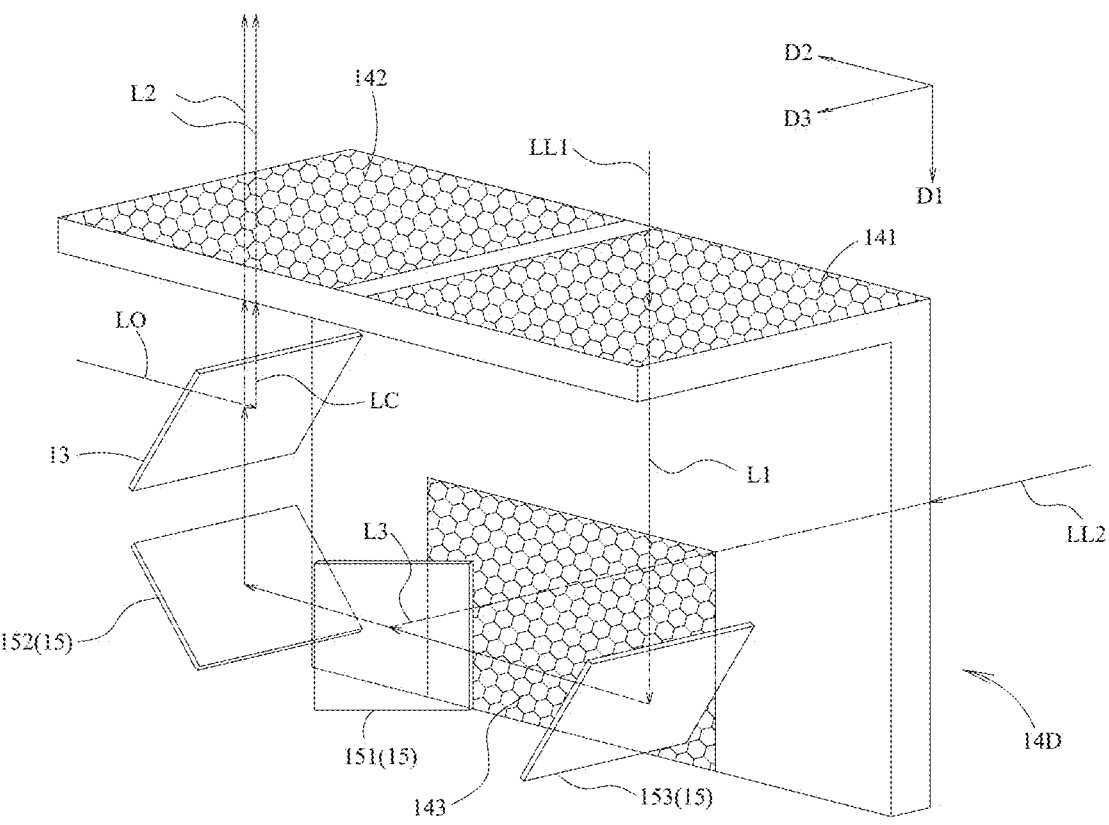
FIG. 28 is a schematic view of a twelfth embodiment of a projection apparatus of the present disclosure, wherein an optical integration element, a lens array element and an optical path bending unit.

Referring to FIG. 28, the projection apparatus of the present embodiment has a structure partially identical to the projection apparatus of the seventh embodiment, and therefore identical numerical are given to identical elements and the descriptions thereof are thus omitted. The light uniformization system D10 includes the optical path integration element 13, a lens array element 14D and the optical path bending unit 15. The projection apparatus of this embodiment differs from the seventh embodiment in that the third array region 143 of the lens array element 14D in the light uniformization system D10 extends from the first array region 141 along the first direction D1, that is, the lens array element is an L-shaped structure, wherein the plurality of third micro lenses of the third array region 143 form a lens array on the plane defined by the first direction D1 and the second direction D2. The second laser light beams LL2 of the second laser light emitting unit 112 enter the third array region 143 along a third direction D3 orthogonal to both the first direction D1 and the second direction D2, whereby the projection apparatus in the first direction D1 is sized smaller.

According to the above embodiments, the projection apparatus and its illumination system of the present application have the effect of light uniformization by enabling the laser light beams emitted by the light source module to pass through the first array region and the second array region of the lens array element sequentially, and the output light beam emitted by the LED light source module also passes through the second array region to produce a uniform light effect. In this way, the laser light beams can completely eliminate the speckles through the first array region and the second array region of the lens array element, and there is no need to utilize the dynamic light-uniformization members used in the conventional technique, such as diffusion wheels and actuators, which is conducive to the miniaturization of the projection apparatus and reduces the noise of the device operation.

Figure 29:
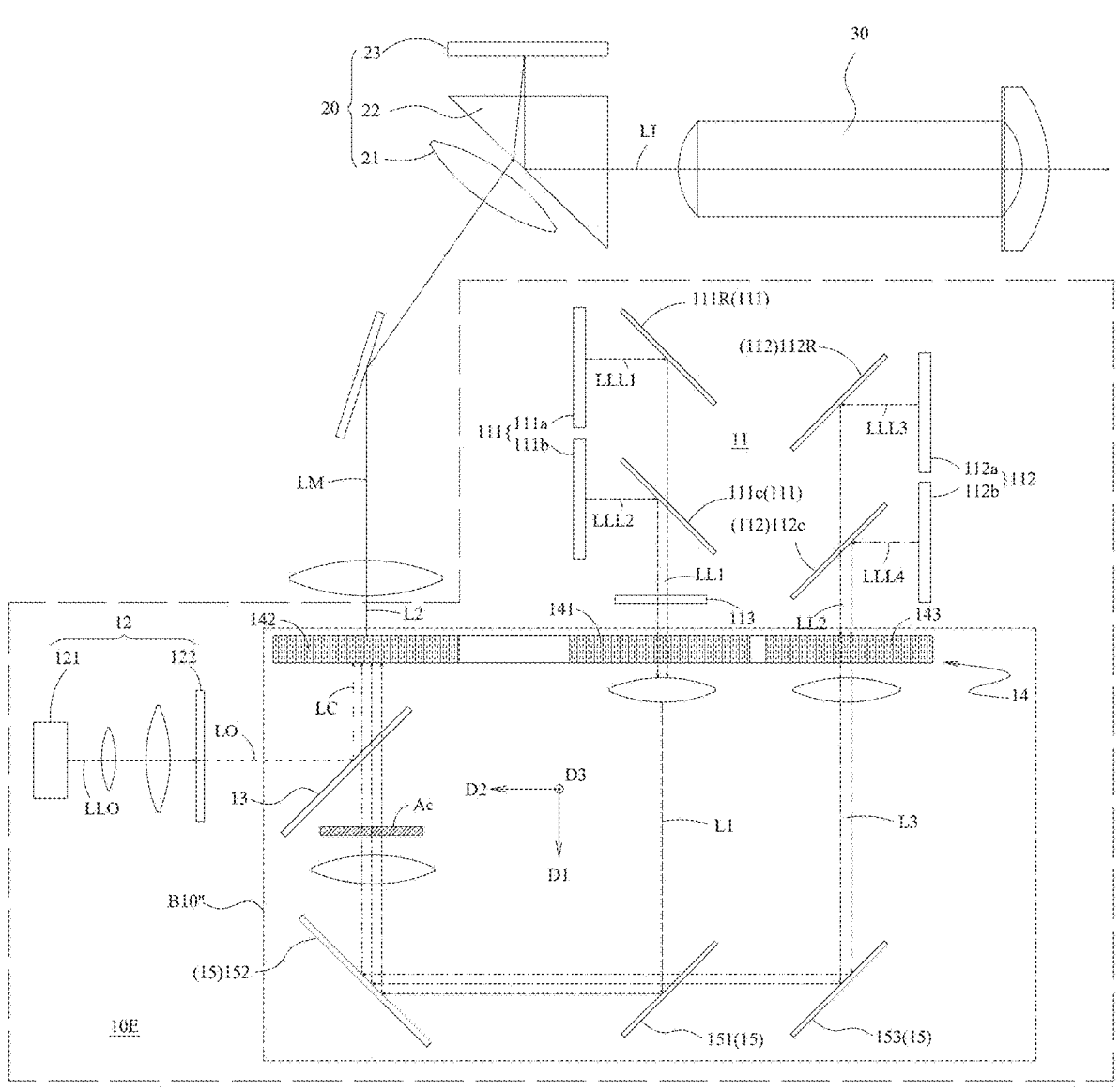
FIG. 29 is a schematic view of a twelve embodiment of a projection apparatus of the present disclosure.

Referring to FIG. 29, the projection apparatus of the present embodiment has a structure partially identical to the projection apparatus of the first embodiment, and therefore identical numerical are given to identical elements and the descriptions thereof are thus omitted. The illumination system 10 includes the light source module 11, the LED light source module 12, and the light uniformization system B10". The light uniformization system B10" includes the optical path integration element 13, the lens array element 14 and the optical path bending unit 15. The projection device of the present embodiment differs from the first embodiment in that an actuator Ac can also be configured in the light uniformization system B10" of the present embodiment. As shown in FIG. 29, the actuator Ac is disposed between the optical path integration element 13 and the optical path bending unit 15 to diffuse and uniformize the first light beam L1 and the third light beam L3 from the optical path bending unit 15. The configuration of actuator Ac to the light uniformization system B10" of the illumination system 10E will further reduce the speckle phenomenon of the laser, so as to further improve the image quality of the projection device.

The projection apparatus and the illumination system thereof of the present disclosure feature that the laser beam emitting from the light source module penetrates the first array region and the second array region of the lens array element to obtain uniformized light beam. The LED light source module emits the output light beam penetrating the second array region to obtained uniformized light beam. Therefore, the speckles of the laser beam can be completely eliminated when the laser beam passes through the first array region and the second array region, and no dynamic light uniformization members are needed as the conventional technique utilizes, such as diffusion wheel and actuator so as to facilitate the miniaturization of the projection apparatus and reduce noise of operation.

The foregoing description of the preferred embodiments of the disclosure has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode of practical application, thereby to enable persons skilled in the art to understand the disclosure in various embodiments and with various modifications as are suited to the particular use or implementation contemplated. It is intended that the scope of the invention be defined by the claims appended hereto and their equivalents, in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the disclosure does not imply a limitation on the invention, and no such limitation is to be inferred. The disclosure is limited only by the spirit and scope of the appended claims. Moreover, these claims may refer to or use "first", "second", etc. for a noun or element. Such terms should be understood as a nomenclature and should not be construed as giving the limitation on the number of the elements modified by such nomenclature unless a specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element or element in the present disclosure is intended to be dedicated to the public regardless of whether the element or element is explicitly recited in the following claims.

What is claimed is:

1. A light uniformization system for uniformizing a plurality of first laser light beams from a light source module, the first laser light beams entering the light uniformization system along a first direction and exiting the light uniformization system along a direction parallel to the first direction to form an illumination light, the light uniformization system comprising:

a lens array element comprising a first array region and a second array region connected to each other and arranged along a second direction, wherein the first array region comprises a first light incident surface, a first light exiting surface and a plurality of first micro lenses, and the first laser light beams enter the first array region through the first light incident surface along the first direction, pass through the first micro lenses and exit the first array region through the first light exiting surface to form a first light beam;

wherein the second array region comprises a second light incident surface, a second light exiting surface and a plurality of second micro lenses, and the first light beam enters the second array region through the second light incident surface, passes through the second micro lenses and exits the second array region through the second light exiting surface to form a second light beam;

wherein the first light incident surface and the second light exiting surface are located at a same surface of the lens array element, and the first direction is perpendicular to the second direction.

2. The light uniformization system as claimed in claim 1, wherein the second light beam exits the second array region through the second light exiting surface and leave the light uniformization system to form the illumination light; a light exiting direction of the first light beam from the first array region and a light exiting direction of the second light beams from the second array region are opposite and both parallel to the first direction.

3. The light uniformization system as claimed in claim 1, wherein the lens array element further comprises a connecting region located between the first array region and the second array region in the second direction and connecting the first array region and the second array region, and the first laser light beams do not pass through the connecting region.

4. The light uniformization system as claimed in claim 1, wherein a distance of the first laser light beams propagating in the first array region is the same with a distance of the first light beam propagating in the second array region.

5. The light uniformization system as claimed in claim 1, further comprising a first optical path folding unit disposed in an optical path of the first light beam between the first light exiting surface and the second light incident surface to change a transmission direction of the first light beam, wherein the first light beam enters the first optical path folding unit along a first transmission direction and exit the first optical path folding unit along a second transmission direction opposite and parallel to the first transmission direction, and the first transmission direction and the second transmission direction are both parallel to the first direction, whereby the optical path of the first light beam between the first light exiting surface and the second light incident surface is U-shaped.

6. The light uniformization system as claimed in claim 5, further comprising a first light condensing unit disposed in the optical path between the first light exiting surface and the second light incident surface to converge the first light beam.

7. The light uniformization system as claimed in claim 6, wherein the first light condensing unit comprises a first condensing lens and a second condensing lens, the first optical path folding unit comprises a first reflecting element and a second reflecting element, and the first condensing lens is disposed between the first array region and the first reflecting element, and the second condensing lens is disposed between the second reflecting element and the second array region;

wherein the first light beam converged by the first condensing lens propagate to the first reflecting element of the first optical path folding unit, which enables the first light beam to propagate to the second reflecting element along the second direction, which changes a transmission direction of the first light beam, whereby the first light beam leaves the second reflecting element along the second transmission direction and pass through the second condensing lens and the second array region sequentially.

8. The light uniformization system as claimed in claim 7, further comprising a first light diffusing element disposed between the second reflecting element and the second array region, wherein the first light beam passing through the first light diffusing element are incident to the second light incident surface.

9. The light uniformization system as claimed in claim 1, further comprising a second light diffusing element disposed in front of the first light incident surface, wherein the first laser light beams pass through the second light diffusing element before the first laser light beams are incident to the first light incident surface.

10. The light uniformization system as claimed in claim 1, wherein the lens array element further comprises a third array region comprising a third light incident surface, a third light exiting surface, and a plurality of third micro lenses; the first array region, the second array region and the third array region are arranged along the second direction sequentially and the second array region is connected to the first array region and the third array region; the second array region is located between the first array region and the third array region; and the second light beam enters the third array region through the third light incident surface, passes through the third micro lenses and exits the third array region through the third light exiting surface along the first direction to form a third light beam;

wherein the first light incident surface, the second light exiting surface and the third light incident surface are located on a same surface of the lens array element.

11. The light uniformization system as claimed in claim 10, wherein the third light beam exits the third light exiting surface and leaves the light uniformization system to form the illumination light, and the third light beam and the first light beam exit the lens array element along a same direction parallel to the first direction.

12. The light uniformization system as claimed in claim 10, further comprising a second optical path folding unit disposed in an optical path of the second light beam between the second light exiting surface and the third light incident surface to change a transmission direction of the second light beam;

wherein the second light beam enters the second optical path folding unit along the second transmission direction parallel to the first direction and leaves the second optical path folding unit along a third transmission direction opposite and parallel to the second transmission direction, whereby the optical path of the second light beam between the second light exiting surface and the third light incident surface is U-shaped.

13. The light uniformization system as claimed in claim 12, further comprising a second light condensing element disposed on the optical path of the second light beam between the second light exiting surface and the third light incident surface to converge the second light beam.

14. The light uniformization system as claimed in claim 12, wherein the second optical path folding unit comprises a third reflecting element and a fourth reflecting element, wherein the second light beam exits the second array region from the second light exiting surface and propagates to the third reflecting element along the second transmission direction, which enables the second light beam to propagate to the fourth reflecting element, where a transmission direction of the second light beam is changed, whereby the second light beam exits the fourth reflecting element before the second light beam enters the third array region.

15. A projection apparatus, comprising:

an illumination system comprising a light source module and the light uniformization system as claimed in claim 1;

wherein the light source module configured to emit the first laser light beams; the light uniformization system disposed in an optical path of the first laser light beams, wherein the first laser light beams are incident to the lens array element through the first light incident surface of the first array region and uniformized several times in the light uniformization system, and the illumination light is emitted from the light uniformization system;

a light modulation module disposed in an optical path of the illumination light and configured to receive the illumination light and convert the illumination light to image light;

a projecting lens disposed in an optical path of the image light and configured to project the image light.

16. The projection apparatus as claimed in claim 15, wherein the light modulation module comprises an optical element, a prism element, and at least one light modulation element, wherein the illumination light passes through the optical element and the prism element and is incident on the at least one light modulation element, the illumination light is converted into the image light by the at least one light modulation element, and the image light propagates to the projecting lens.

17. The projection apparatus as claimed in claim 15, wherein the light uniformization system, the light modulation module and the projecting lens are disposed on a first plane defined by the first direction and the second direction, and orthographic projections of the light uniformization system, the light modulation module, and the projecting lens on the first plane do not overlap.

18. The projection apparatus as claimed in claim 17, wherein the second direction is parallel to the direction of gravity, and the first plane is perpendicular to a horizontal plane.

19. The projection apparatus as claimed in claim 15, wherein a third direction perpendicular to the first plane is defined, and an orthographic projection of the second light exiting surface of the second array region on a second plane defined by the second direction and the third direction is located between an orthographic projection of the first light incident surface of the first array region on the second plane and an orthographic projection of a light exiting surface of the projecting lens on the second plane.

20. The projection apparatus as claimed in claim 15, wherein a first plane is defined by the first direction and the second direction, a third direction is perpendicular to the first plane, and a third plane is defined by the first direction and the third direction, wherein the light uniformization system is disposed on the first plane, and orthographic projections of the light source module and the light uniformization system on the first plane do not overlap; and wherein the light modulation module and the projection lens projecting lens disposed on the third plane, and the orthographic projections of the light modulation module and the projecting lens do not overlap.

21. The projection apparatus as claimed in claim 20, wherein an orthographic projection of the second light exiting surface of the second array region and an orthographic projection of a light exiting surface of the projecting lens on a second plane defined by the second direction and the third direction are arranged along the third direction, and the orthographic projection of the second light exiting surface of the second array region and an orthographic projection of the first light incident surface of the first array region on the second plane are arranged along the second direction.

22. The projection apparatus as claimed in claim 20, wherein the light source module comprises a plurality of laser light emitting units emitting light beams of different colors.

23. An illumination system for providing an illumination light, comprising:

a light uniformization system as claimed in claim 1;

a light source module configured to emit the first laser light beams;

an LED light source module configured to emit an output light beam;

an optical path integration element disposed in an optical path of the output light beam and an optical path of the first light beam, wherein the first light beam and the output light beam are respectively incident on two opposite sides of the optical path integration element;

wherein the first light beam is guided and transmitted to the second array region of the lens array element by the optical path integration element, the first light beam passes through the second array region of the lens array element to form the second light beam; and wherein the output light beam is guided by the optical path integration element to form an output color light beam, the output color light beam penetrates the second array region of the lens array element, and the illumination light comprises the output color light beam and/or the second light beam.

24. The illumination system as claimed in claim 23, wherein a wavelength range of the output color light beam is different from that of the first laser light beams.

25. The illumination system as claimed in claim 23, wherein the light source module comprises a first laser light emitting unit comprising a first light source element, a second light source element, and a first light combining element, the first light source element emits a plurality of first output light beams, the second light source element emits a plurality of second output light beams, the first output light beams and the second output light beams are transmitted along different optical paths and are guided by the first light combining element to form the first laser light beams, and the first output light beams have a wavelength range of each of the first output light beams different from or identical to a wavelength range of each of the second output light beams.

26. The illumination system as claimed in claim 23, further comprising an optical path bending unit arranged in the optical path of the first light beam, wherein the first light beam is transmitted to the optical path bending unit along the first direction, and leaves the optical path bending unit along a first transmission direction, and the first transmission direction is parallel and opposite to the first direction.

27. The illumination system as claimed in claim 26, wherein the light source module further comprises a second laser light emitting unit configured to emit a plurality of second laser light beams, and the second laser light beams are incident on the lens array element along the first direction, the lens array element further comprises a third array region arranged along the first direction or the second direction and connected to the first array region, the third array region comprises a plurality of third micro lenses, the second laser light beams penetrate the third array region to form a third light beam.

28. The illumination system as claimed in claim 27, wherein the optical path bending unit further comprises a first reflecting element and a second reflecting element, the optical path bending unit is arranged in an optical path of the third light beam, the first light beam is transmitted to the optical path bending unit along the first direction, the first light beam and the third light beam leave the optical path bending unit along the first transmission direction, the first reflecting element allows the third light beam to pass and reflects the first light beam, the second reflecting element is configured to reflect the first light beam and the third light beam from the first reflecting element, whereby the first light beam and the third light beam travel to the optical path integration element along the first transmission direction.

29. The illumination system as claimed in claim 28, wherein the optical path bending unit further comprises a third reflecting element arranged in the optical path of the third light beam, the third light beam is incident on the third reflecting element along the first direction, and is guided by the third reflecting element to the first reflecting element along the second direction.

30. The illumination system as claimed in claim 27, wherein the second laser light emitting unit comprises a third light source element, a fourth light source element and a second light combining element, the third light source element emits a plurality of third output light beams, the fourth light source element emits a plurality of fourth output light beams, the third output light beams and the fourth output light beams are transmitted along different optical paths to the second light combining element and are guided by the second light combining element to form the second laser light beams, and a wavelength range of each of the third output light beams is different from or identical to a wavelength range of each of the fourth output light beams.

31. The illumination system as claimed in claim 30, wherein a wavelength range of each of the first laser light beams is different from a wavelength range of each of the second laser light beams.

32. The illumination system as claimed in claim 25, wherein the first light source element comprises a plurality of first light emitting elements arranged in an array, the first light emitting elements emit the first output light beams, and the second light source element comprises a plurality of second light emitting elements arranged in another array, and the second light emitting elements emit the second output light beams.

33. The illumination system as claimed in claim 30, wherein the third light source element comprises a plurality of third light emitting elements arranged in an array, the third light emitting elements emit the third output light beams, and the fourth light source element comprises a plurality of fourth light emitting elements arranged in another array, and the fourth light emitting elements emit the fourth output light beams.

34. The illumination system as claimed in claim 25, wherein the first laser light emitting unit further comprises a third light source element and a fourth light source element, the third light source element emits a plurality of third output light beams, the fourth light source element emits a plurality of fourth output light beams, the third output light beams and the fourth output light beams are transmitted along different optical paths to the first light combining element to form the first laser light beams, the first output light beams and the second output light beams have the same wavelength range, and the first output light beams, the third output light beams, and the fourth output light beams have different wavelength ranges.

35. The illumination system as claimed in claim 23, wherein the first light source element comprises a plurality of first light emitting elements emitting the first output light beams, the third light source element comprises a plurality of third light emitting elements emitting the third output light beams, the second light source element comprises a plurality of second light emitting elements emitting the second output light beams, the fourth light source element comprises a plurality of fourth light emitting elements emitting the fourth output light beams, the first light emitting elements and the third light emitting elements are alternately arranged, and the second light emitting elements and the fourth light emitting elements are alternately arranged.

36. The illumination system as claimed in claim 23, wherein the light source module comprises a first laser light emitting unit comprising a first light source element and a second light source element, the first light source element comprises a plurality of first light emitting elements emitting the first output light beams, the second light source element comprises a plurality of second light emitting elements emitting the second output light beams, the first output light beams or the second output light beams form the first laser light beams directly, and the first light emitting elements and the second light emitting elements are alternately arranged to form an array.

37. The illumination system as claimed in claim 24, wherein the LED light source module comprises a LED light source element and a light filter, the LED light source element emits an LED light beam, at least a portion of the LED light beam passes through the light filter to form the output light beam.

38. The illumination system as claimed in claim 36, wherein a wavelength range of the LED light beam comprises a wavelength range of the output color light, and a portion of the LED light beam having a wavelength range corresponding to blue light is reflected by the light filter.

39. The illumination system as claimed in claim 30, wherein a light emitting time period comprises a first time sequence, a second time sequence and a third time sequence, the first time sequence, the second time sequence and the third time sequence are separated, the first laser light beams, the third output light beams of the second laser light beams and the fourth output light beams of the second laser light beams generate in the first time sequence, the second time sequence and the third time sequence respectively in the light emitting times period, the output light beam generates in the first time sequence and the second time sequence, and is not provided in the third time sequence.

40. The illumination system as claimed in claim 38, wherein the light emitting time period further comprises a fourth time sequence in which the output light beam generates.

41. A projection apparatus, comprising:

the illumination system as claimed in claim 23, wherein the output color light beam and/or the second light beam are generated by the illumination system to form the illumination light;

a light modulation module disposed in an optical path of the illumination light and configured to receive the illumination light and convert the illumination light to an image light; and a projecting lens disposed in an optical path of the image light and configured to project the image light to form an image.

42. The projection apparatus as claimed in claim 41, wherein the light modulation module comprises a prism element and at least one light modulation element, the illumination light is transmitted to the prism element and the at least one light modulation element sequentially, and the illumination light is converted to the image light by the at least one light modulation element.

43. The projection apparatus as claimed in claim 41, wherein the second direction is parallel to an optical axis of the projecting lens.

* * * * *